(12) United States Patent
Kanezuka et al.

(10) Patent No.: US 11,815,237 B2
(45) Date of Patent: Nov. 14, 2023

(54) VEHICLE LAMP HAVING TWO LAMP UNITS WITH AT LEAST ONE COMPRISING A LIGHT GUIDE

(71) Applicant: KOITO MANUFACTURING CO., LTD., Tokyo (JP)

(72) Inventors: Shohei Kanezuka, Shizuoka (JP); Haruka Morii, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/782,941

(22) PCT Filed: Dec. 7, 2020

(86) PCT No.: PCT/JP2020/045473
§ 371 (c)(1),
(2) Date: Jun. 6, 2022

(87) PCT Pub. No.: WO2021/117677
PCT Pub. Date: Jun. 17, 2021

(65) Prior Publication Data
US 2023/0003355 A1 Jan. 5, 2023

(30) Foreign Application Priority Data

Dec. 12, 2019 (JP) ................................. 2019-224321
Dec. 12, 2019 (JP) ................................. 2019-224322
Dec. 12, 2019 (JP) ................................. 2019-224323

(51) Int. Cl.
*F21S 41/24* (2018.01)
*F21S 41/33* (2018.01)
(Continued)

(52) U.S. Cl.
CPC ............. *F21S 41/24* (2018.01); *F21S 41/148* (2018.01); *F21S 41/33* (2018.01); *B60Q 1/04* (2013.01)

(58) Field of Classification Search
CPC ........ F21S 41/24; F21S 43/235; F21S 43/236; F21S 43/237; F21S 43/239
See application file for complete search history.

(56) References Cited

U.S. PATENT DOCUMENTS 10,300,835 B2 * 5/2019 Mochizuki ............... B60Q 1/34
10,612,743 B2 * 4/2020 Shih ...................... F21S 41/321
(Continued)

FOREIGN PATENT DOCUMENTS

JP 2003-100114 A 4/2003
JP 2012-64533 A 3/2012
(Continued)

OTHER PUBLICATIONS

International Search Report (PCT/ISA/210) dated Feb. 16, 2021 by the International Searching Authority in counterpart International Patent Application No. PCT/JP2020/045473.
(Continued)

*Primary Examiner* — Robert J May
(74) *Attorney, Agent, or Firm* — Sughrue Mion, PLLC

(57) ABSTRACT

A composite vehicle lamp includes: a lamp unit; and a lamp housing configured to house a plurality of the lamp units. Each of the plurality of the lamp units has: a light source; and an optical system configured to emit light from the light source in a desired light distribution. The plurality of the lamp units includes: one light-guide-type lamp unit having a light guide; and another light-guide-type lamp unit having another light guide whose form is different from that of the one light-guide-type lamp unit. The one light-guide-type (Continued)

lamp unit and the another light-guide-type lamp unit are turned on as lamps having the same function.

8 Claims, 12 Drawing Sheets

(51) Int. Cl.
*F21S 41/148* (2018.01)
*B60Q 1/04* (2006.01)

(56) References Cited

U.S. PATENT DOCUMENTS

| | | |
|---|---|---|
| 2003/0053318 A1 | 3/2003 | Amano |
| 2013/0272009 A1 | 10/2013 | Fujiu et al. |
| 2016/0311363 A1 | 10/2016 | Fergio et al. |
| 2019/0285241 A1* | 9/2019 | Ikuta .................... F21S 43/239 |

FOREIGN PATENT DOCUMENTS

| | | |
|---|---|---|
| JP | 2012-190762 A | 10/2012 |
| JP | 2013-222553 A | 10/2013 |
| JP | 2015-8081 A | 1/2015 |
| JP | 2016-39121 A | 3/2016 |
| JP | 2016-85829 A | 5/2016 |
| JP | 2016-105372 A | 6/2016 |
| JP | 2017-103173 A | 6/2017 |
| JP | 2017-147105 A | 8/2017 |
| JP | 2018-166090 A | 10/2018 |
| JP | 2019-67521 A | 4/2019 |

OTHER PUBLICATIONS

Written Opinion (PCT/ISA/237) dated Feb. 16, 2021 by the International Searching Authority in counterpart International Patent Application No. PCT/JP2020/045473.

* cited by examiner

VEHICLE LAMP HAVING TWO LAMP UNITS WITH AT LEAST ONE COMPRISING A LIGHT GUIDE

TECHNICAL FIELD

The present disclosure relates to a vehicle lamp including a light guide.

BACKGROUND

As for a vehicle lamp, especially an automobile lamp, a lamp in which a plurality of lamp units are combined is provided. An edge lamp unit including a light guide is proposed as one of the lamp units. For example, Patent Literature 1 discloses such an edge lamp unit. In the edge lamp, one end surface (an edge) of a light-guiding plate, or an edge light guide, is configured as an emission surface. The emission surface is configured to guide light incident on an incident surface provided on the opposite side of the edge light guide from a light source and to emit narrow or linear light pattern from the emission surface. It is possible to provide an aesthetic lamp by using such an edge lamp unit.

In the edge lamp unit of Patent Literature 1, a plurality of light sources each of which is assigned to a divided section of the emission surface is arranged along a lengthwise direction of the edge light guide in order to equalize brightness of light emitted from the emission surface. In addition, the edge light guide is provided with a plurality of reflection surfaces each of which corresponds to the respective light sources in order to guide light from each light source to each divided section of the emission surface uniformly.

Moreover, as for a vehicle lamp, especially an automobile lamp, a composite lamp in which a plurality of lamps having different functions is housed in the same lamp housing. For example, a lamp in which a low-beam lamp, a high-beam lamp, a clearance lamp, a turn signal lamp, and the like are combined is proposed as a composite head lamp. A lamp in which a tail lamp, a backup lamp, a turn signal lamp, and the like are combined is also proposed as a composite tail lamp.

Shared parts are utilized in such a composite lamp. For example, Patent Literature 2 discloses a composite lamp that includes a first lamp having a reflector and second lamp having a reflector, in which a light source of each lamp is mounted on a common substrate. Similarly, Patent Literature 3 discloses a composite lamp in which a light source is mounted on each of the front and back surfaces of one substrate and a lamp is configured with each light source. According to Patent Literature 2 or 3, the number of substrates on which a light source is mounted can be reduced, which is advantageous in reducing the size and the cost of a lamp.

Furthermore, as for a vehicle lamp, especially an automobile lamp, a light-guide-type lamp unit using a light guide made of a translucent member as an optical system configured to emit light from a light source in a desired light distribution is used. The light-guide-type lamp unit is used in, for example, an auxiliary lamp and a signal lamp. The light-guide-type lamp unit is also used in a composite lamp in which a plurality of lamp units having different functions is housed in the same lamp housing as one of the lamp units.

Patent Literature 4 discloses a light-guide-type lamp unit (referred to as a rod lamp unit) including a rod light guide that has a rodlike shape and that is provided with a reflecting element configured to emit light in a lengthwise direction of the rod light guide. Patent Literature 1 discloses a light-guide-type lamp unit (referred to as an edge lamp unit) including an edge lamp unit that has a tabular shape and from whose edge (end surface) light is emitted.

CITATION LIST

Patent Literature

Patent Literature 1: JP2019-67521A
Patent Literature 2: JP2016-105372A
Patent Literature 3: JP2018-166090A
Patent Literature 4: JP2017-103173A

SUMMARY OF INVENTION

Technical Problem

In the edge lamp unit of Patent Literature 1, the emission surface of the edge light guide inclines, and the plurality of reflection surfaces is terraced correspondingly along the inclination of the emission surface. Since a step is formed between the reflection surfaces, it is difficult to reflect light uniformly toward the emission surface at a boundary formed by the step. In this case, the light guided to the emission surface is not distributed uniformly, and brightness on the emission surface is unequalized. When the edge lamp unit is turned on in this case, light distribution characteristics and appearance of the lamp deteriorate, which may damage design of the lamp.

A first object of the present disclosure is to provide a vehicle lamp that can prevent unequalized brightness on an emission surface of a light guide as in an edge lamp unit.

As a composite lamp in which a plurality of lamps having different functions is housed in the same lamp housing, a composite lamp is proposed in which each of the plurality of lamps to be combined is configured as a lamp unit and the lamp units are housed in a lamp housing. In recent years, a lamp is proposed in which a plurality of lamp units having different optical systems is combined for good design. For example, a reflector-type lamp unit configured to control light distribution by a reflector reflecting light from a light source, a lens-type lamp unit configured to control light distribution by a lens refracting light from a light source, and a light-guide-type lamp unit configured to control light distribution by a light guide guiding light from a light source are combined.

In the composite lamps disclosed in Patent Literature 2 and 3, since each lamp to be combined is configured as a lamp unit and each lamp unit is configured as a reflector-type lamp unit having the same optical system, it is easy to use a shared substrate on which light sources are mounted. As for lamp units having different optical systems, such as a reflector-type lamp unit, a lens-type lamp unit, and a light-guide-type lamp unit, however, arrangement of light sources with respect to optical systems, requirements for designing emission directions of light for optical systems, and the like are different. Therefore, it is difficult to use shared parts among lamp units having different optical systems, which makes it difficult to reduce the size and the cost of the composite lamp.

A second object of the present disclosure is to provide a vehicle lamp that can use shared parts even in a composite lamp including a plurality of lamp units having different forms of optical systems.

In a composite lamp including a light-guide-type lamp unit, either a rod lamp unit or an edge lamp unit, among which the forms of light guides are different, is selectively used as in Patent Literature 1 and 4. Even in a case where a plurality of light-guide-type lamp units is combined, each lamp unit is configured with either a rod lamp unit or an edge lamp unit. A composite lamp has not been proposed in which a rod lamp unit and an edge lamp unit are combined. Since the appearance does not change much when the lamp unit or the composite lamp is turned on, it is desired to improve the design of the lamp.

A third object of the present disclosure is to provide a vehicle lamp that can improve design of a composite lamp including a light-guide-type lamp unit.

Solution to Problem

According to an aspect of the present disclosure, a vehicle lamp includes: a light source; and a light guide configured to guide light from the light source to emit the light, in which the light guide includes: an incident surface on which the light from the light source is incident; an emission surface from which the guided light is emitted outside; and a reflection surface on which the light from the incident surface is internally reflected toward the emission surface, the reflection surface includes a plurality of contiguous reflection surface sections, and each boundary between the plurality of reflection surface sections is provided with a reflection step configured to internally reflect the light divergently or diffusely.

According to another aspect of the present disclosure, a composite vehicle lamp includes: a lamp unit having: a light source; and an optical system configured to emit light from the light source in a desired light distribution; and a lamp housing configured to house a plurality of the lamp units, in which a first lamp unit of the lamp units is a light-guide-type lamp unit, the vehicle lamp further includes a substrate on which the light source of the first lamp unit and that of a second lamp unit of the lamp units are mounted, the light source of the first lamp unit is mounted on one surface of the substrate, and the light source of the second lamp unit is mounted on a surface of the substrate opposite to the one surface.

According to another aspect of the present disclosure, a composite vehicle lamp includes: a lamp unit having: a light source; and an optical system configured to emit light from the light source in a desired light distribution; and a lamp housing configured to house a plurality of the lamp units, in which the plurality of the lamp units include: one light-guide-type lamp unit having a light guide of one form; and another light-guide-type lamp unit having a light guide of a form different from the one form, the one light-guide-type lamp unit and the another light-guide-type lamp unit are configured to light up as a lamp having the same function.

Advantageous Effects of Invention

According to the present disclosure, since a reflection step is foamed on each boundary between the reflection surface sections, light projected onto the boundaries is reflected divergently or diffusely and not in a specific direction. Since it is possible to prevent the light reflected on the boundaries from being emitted from a pan of the emission surface, it is possible to prevent unequalized brightness on the emission surface. Accordingly, a vehicle lamp with equalized brightness having desirable light distribution and good design can be provided.

According to the present disclosure, the first lamp unit out of the plurality of lamp units in the composite lamp is configured as a light-guide-type lamp unit. Since light sources in a light-guide-type lamp unit can be arranged more freely than in reflector-type or lens-type one, the light-guide-type lamp units can be designed more flexibly. Therefore, it is possible to use a shared substrate on which light sources of the first lamp unit and the second lamp unit are mounted with the first lamp unit configured as a light-guide-type lamp unit.

According to the present disclosure, lamp units having different forms of light guides, such as a rod lamp unit and an edge lamp unit are configured to light up as a lamp having one function. Since a relatively narrow light-emitting surface of the rod lamp unit and a relatively broad light-emitting surface of the edge lamp unit are combined, for example, design effects when the lamp units light up improved as compared with a lamp in which either rod lamp units or edge lamp units are combined. The design effects are improved when the rod lamp unit and the edge lamp unit light up independently.

DESCRIPTION OF EMBODIMENTS

Figure 1:
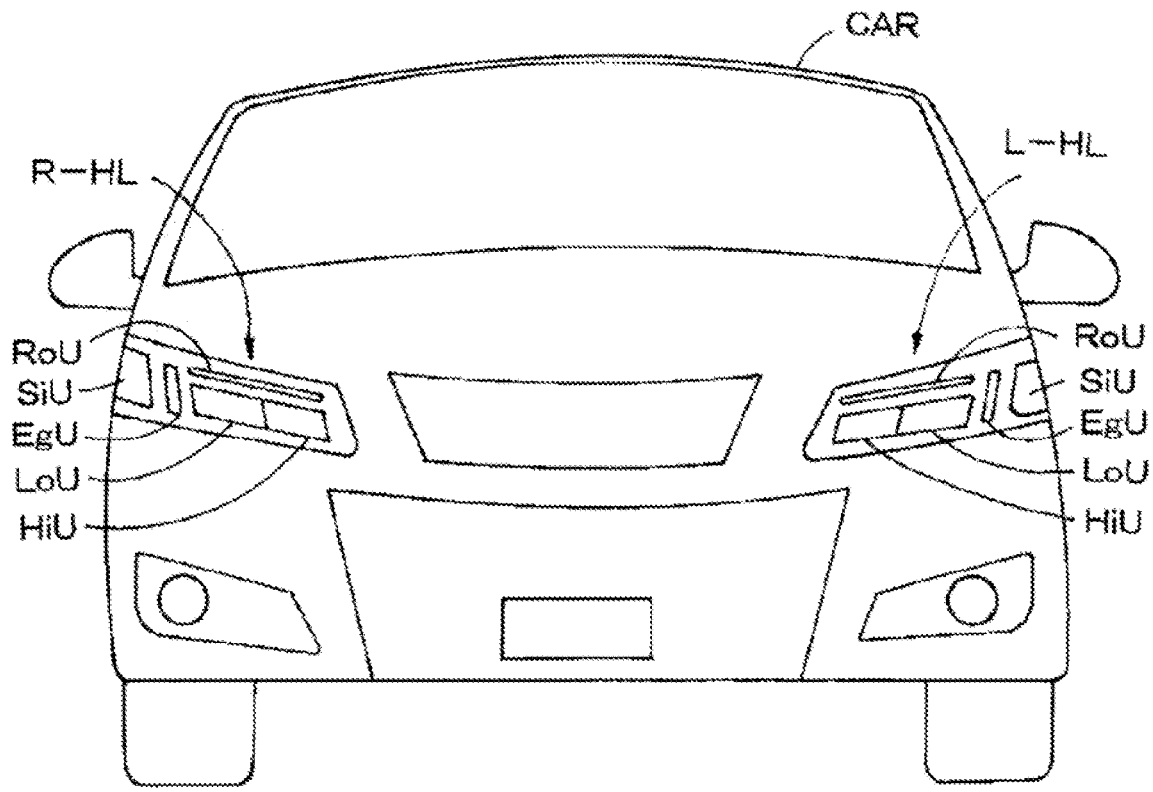
FIG. 1 is a front view showing an automobile including a vehicle lamp according to the present disclosure as a head lamp.

Next, embodiments of the present disclosure will be described with reference to the drawings. FIG. 1 is a front view showing an automobile including a head lamp configured as a vehicle lamp according to the present disclosure. Left and right sides of a front portion of a body of the automobile CAR are provided with a left head lamp L-HL and a right head lamp R-HL that are referred to as head lamps HL. The left and right head lamps and R-HL are each configured as a composite head lamp including a plurality of lamp units and are bilaterally symmetrical.

Figure 2:
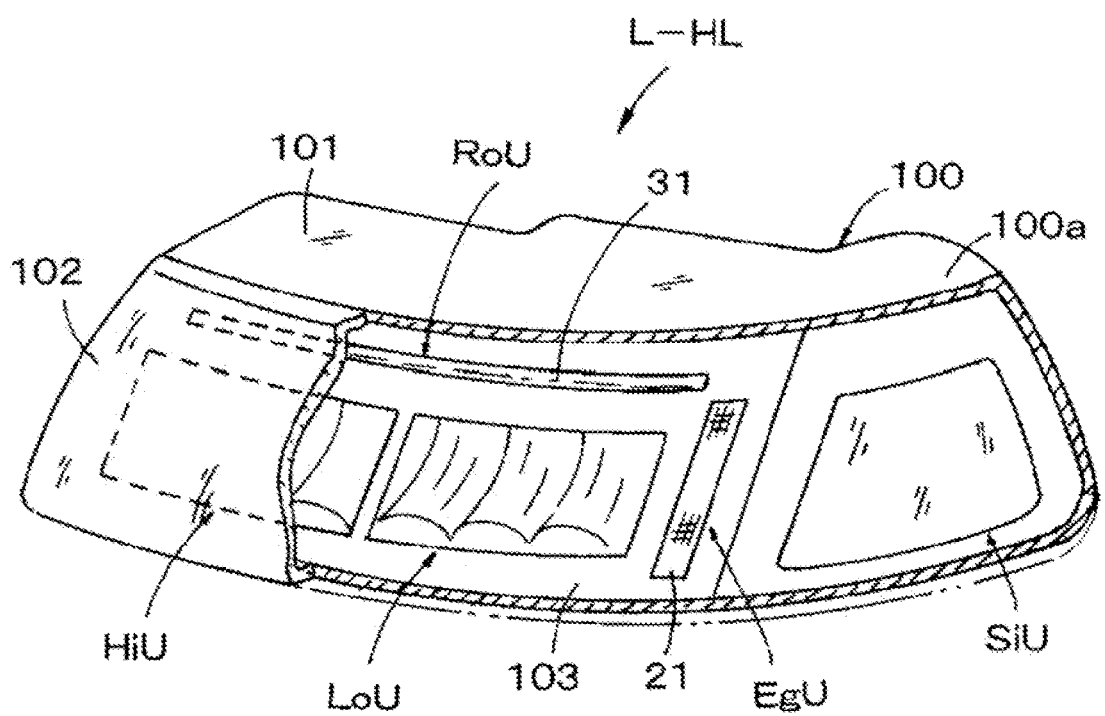
FIG. 2 is a perspective view schematically showing a left head lamp shown in FIG. 1 cut in part.

FIG. 2 is a front perspective view showing the left head lamp L-HL shown in FIG. 1 cut in part. The left head lamp L-HL includes a lamp housing 100. The lamp housing 100 includes: a lamp body 101; and a translucent cover 102 installed to cover a front side of the lamp body 101. The lamp housing 100 includes a bend 100a extending from a front side of the automobile CAR toward an outer (right in FIG. 2) side in a vehicle width direction. A front surface of the translucent cover 102 inclines rearward correspondingly to a curved shape of the front portion of the vehicle body of the automobile CAR.

A plurality of lamp units are housed in the lamp housing 100. Specifically, a low-beam lamp unit LoU and a high-beam lamp unit HiU as head lamps; an edge lamp unit EgU and a rod lamp unit RoU as auxiliary lamps; and a side lamp unit SiU as a signal lamp are housed in the lamp housing 100. The low-beam lamp unit LoU and the high-beam lamp unit HiU are configured as reflector-type lamp units. The edge lamp unit EgU and the rod lamp unit RoU are configured as light-guide-type lamp units. The side lamp unit SiU is configured as a lens-type lamp unit.

An extension 103 configured to function as a pseudo-reflector is in the lamp housing 100 such that the extension 103 does not overlap with the lamp units. The extension 103 prevents the interior of the lamp housing 100 except the lamp units from being exposed through the translucent cover 102. In the following, unless otherwise specified, a front-rear direction refers to a front-rear direction of the automobile CAR and the left head lamp L-HL and a left-right direction is based on FIGS. 1 and 2. Therefore, the outer side of the automobile CAR in the vehicle width direction is the right side.

The lamp units will be described briefly. In FIG. 2, the low-beam lamp unit LoU and the high-beam lamp unit HiU are integrally formed such that they are aligned in a left-right or horizontal direction with the low-beam lamp unit LoU placed on the right side, that is, on the outer side in the vehicle width direction. The low-beam lamp unit LoU and the high-beam lamp unit HiU each includes: a first light source; a second light source; and a reflector configured to reflect light from the first light source or the second light source ahead of the automobile in a predetermined light distribution pattern.

The edge lamp unit EgU is on the outer side of the low-beam lamp unit LoU in the vehicle width direction. The edge lamp unit EgU includes: a third light source; and an edge light guide configured with a light-guiding (translucent) plate. The edge lamp unit EgU is configured to guide light from the third light source with the edge light guide to emit the light ahead of the automobile from an edge which is a front end surface of the edge light guide.

The rod lamp unit RoU extends in the left-right or horizontal direction along upper edges of the low-beam lamp unit LoU and the high-beam lamp unit HiU. The rod lamp unit RoU includes: a fourth light source; and a rod light guide configured with a rod-shaped (translucent) light guide. The rod lamp unit RoU is configured to guide light from the fourth light source in a lengthwise direction with the rod light guide to emit the light ahead of the automobile from a circumferential surface extending in the lengthwise direction of the rod light guide.

In this embodiment, the edge lamp unit EgU and the rod lamp unit RoU is configured to function as a clearance lamp or a daytime running lamp with lighting of the edge lamp unit EgU and the rod lamp unit RoU controlled. That is, when the edge lamp unit EgU and the rod lamp unit RoU are simultaneously turned on with predetermined brightness, they function as a clearance lamp in a body. When the edge lamp unit EgU and the rod lamp unit RoU are turned on with brightness higher than the predetermined brightness described above, they function a daytime running lamp.

The side lamp unit SiU includes: a fifth light source; and a lens configured to emit light from the fifth light source toward a desired lateral region of the automobile. The side lamp unit SiU is on the outer side of the edge lamp unit EgU in the vehicle width direction, in particular, in the bend 100a of the lamp housing 100.

Figure 3:
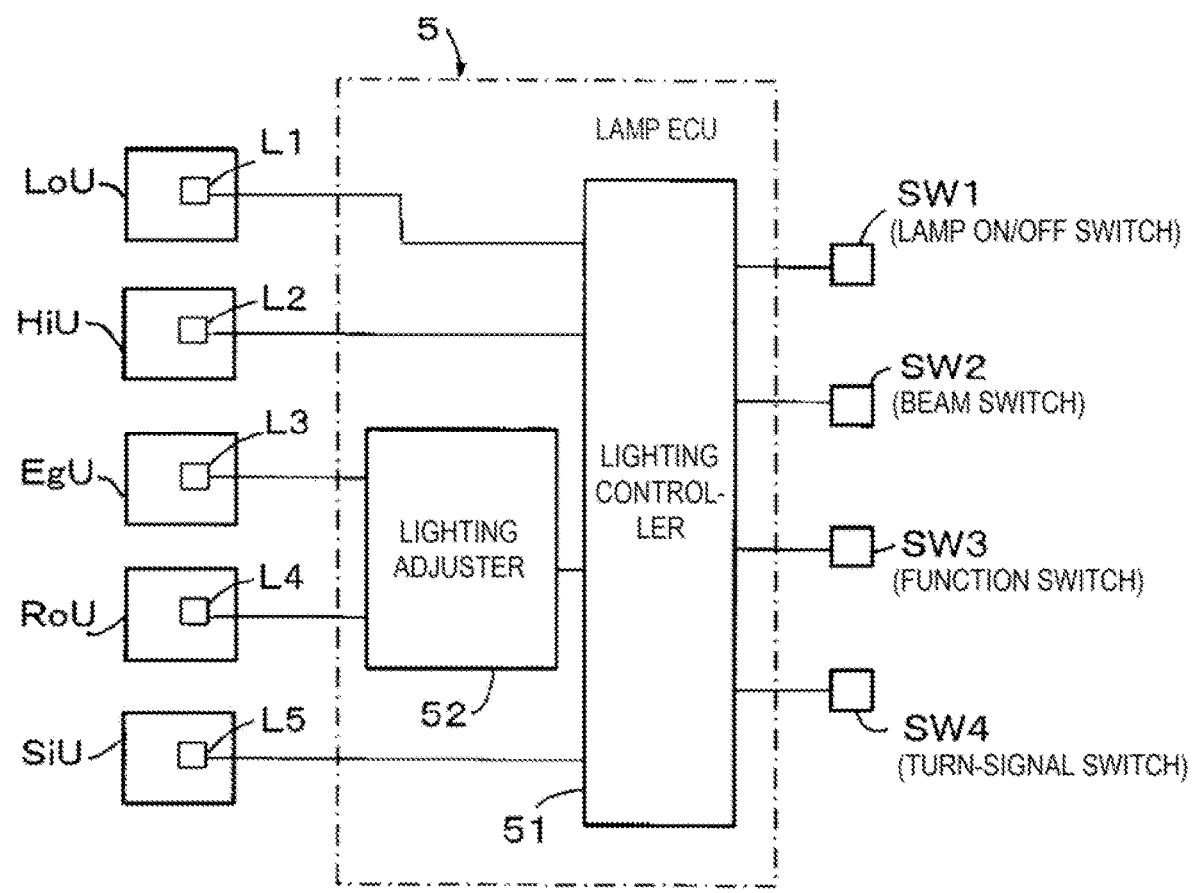
FIG. 3 is a block diagram showing an electrical system of a lamp unit.

FIG. 3 is a block configuration diagram showing an electrical system of the lamp units LoU, HiU, EgU, RoU, and SiU. The lamp units LoU, HiU, EgU, RoU, and SiU are connected to a lamp electronic control unit (ECU) 5 and are powered by electricity from an in-vehicle battery (not shown). The lamp ECU is an example of a lighting controller. In FIG. 3, L1 to L5 refer to the first to fifth light sources m the lamp units LoU, HiU, EgU, RoU, and SiU.

The lamp ECU 5 includes a lighting controller 51. The lighting controller 51 is configured to control lighting of the first light source L1 to the fifth light source L5, which are light sources of the lamp units, to control lighting of the lamp units LoU, HiU, EgU, RoU, and SiU. The lamp ECU 5 includes a lighting adjuster 52 configured to adjust brightness of the edge lamp unit EgU and the rod lamp unit RoU, that is, a light-emission intensity of the third light source L3 and the fourth light source L4.

A lamp on/off switch SW1, a beam switch SW2, a function switch SW3, and a turn-signal switch SW4 are connected to the lamp ECU 5 and are operable by a driver. The edge lamp unit EgU and the rod lamp unit RoU are turned on as the lamp on/off switch SW1 is turned on. Brightness of the edge lamp unit EgU and the rod lamp unit RoU is switched by the function switch SW3. The low-beam lamp unit and the high-beam lamp unit are turned on or off as the beam switch SW2 is switched. The side lamp unit SiU blinks as a turn signal lamp as the turn-signal switch SW4 is turned on.

Next, the lamp units LoU, HiU, EgU, RoU, and SiU will be described detailed.

Low-Beam Lamp Unit LoU and High-Beam Lamp Unit HiU

Figure 4:
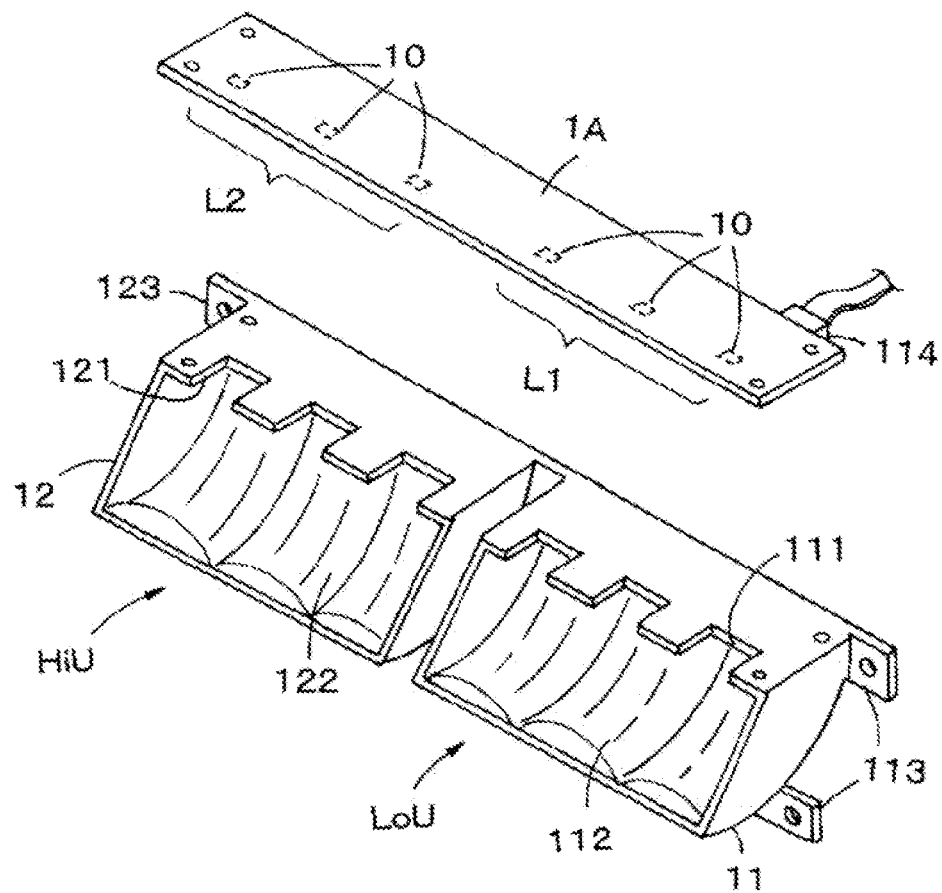
FIG. 4 is an exploded perspective view showing a low-beam lamp unit and a high-beam lamp unit.

FIG. 4 is an exploded perspective view schematically showing the low-beam lamp unit LoU and the high-beam lamp unit HiU. The low-beam lamp unit LoU includes: the first light source L1; and a reflector 11. The high-beam lamp unit HiU includes: the second light source L2; and a reflector 12. The reflector 11 and the reflector 12 are examples of an optical system.

The first light source L1 and the second light source L2 each include a plurality of (in this embodiment, three) white LEDs 10 configured to emit white light. These six white LEDs 10 are mounted on a lower surface of an A-substrate 1A supported in a horizontal direction on upper portions of the reflectors 11 and 12 such that their light-emitting surfaces face downward and they are placed at a desired interval in the left-right direction. The A-substrate 1A is on upper surfaces of the reflectors 11 and 12. The white LEDs 10 are in cut windows 111 and 121 respectively provided in upper portions of the reflectors 11 and 12 of the low-beam lamp unit LoU and the high beam lamp unit HiU. The A-substrate 1A is electrically connected to the lamp ECU 5 via a connector 114.

In this example, the reflectors 11 and 12 are integrally formed such that three reflection surfaces 112 and 122 are aligned in the left-right direction. The reflection surfaces 112 and 122 have parabolic or similar shapes, but the high-beam lamp unit and the low-beam lamp unit are configured differently in part. The reflection surfaces 112 and 122 are configured to reflect light from the corresponding white LEDs 10 via the translucent cover 102 ahead of the automobile. The reflectors 11 and 12 are attached to the lamp body 101 with fixing pieces 113 and 123 on the reflectors 11 and 12.

Figure 5:
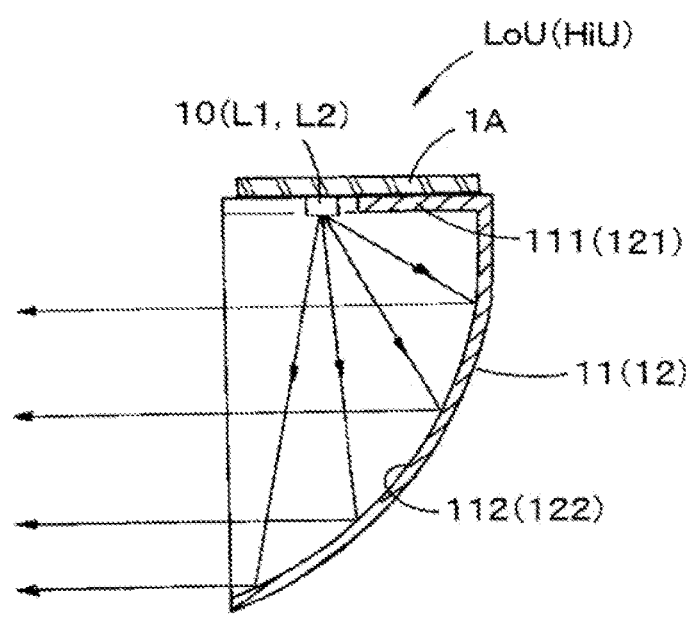
FIG. 5 is a vertical cross-sectional view schematically showing the low-beam lamp unit and the high-beam lamp unit when lighting up.

Accordingly, in the low-beam lamp unit LoU, the first light source L1 emits light as the lamp on/off switch SW1 is turned on and the beam switch SW2 is switched to a low beam. As shown in the schematic cross-sectional view of FIG. 5, the light from the white LEDs 10 as the first light source L1 is reflected by the reflection surface 112 of the reflector 11 ahead of the automobile, thereby forming a low-beam light distribution. As the beam switch SW2 is switched, the second light source L2 emits light. Although not shown, the light reflected by the reflection surface 122 of the reflector 12 is added to the low-beam light distribution, thereby forming a high-beam light distribution.

Edge Lamp Unit EgU

Figure 6:
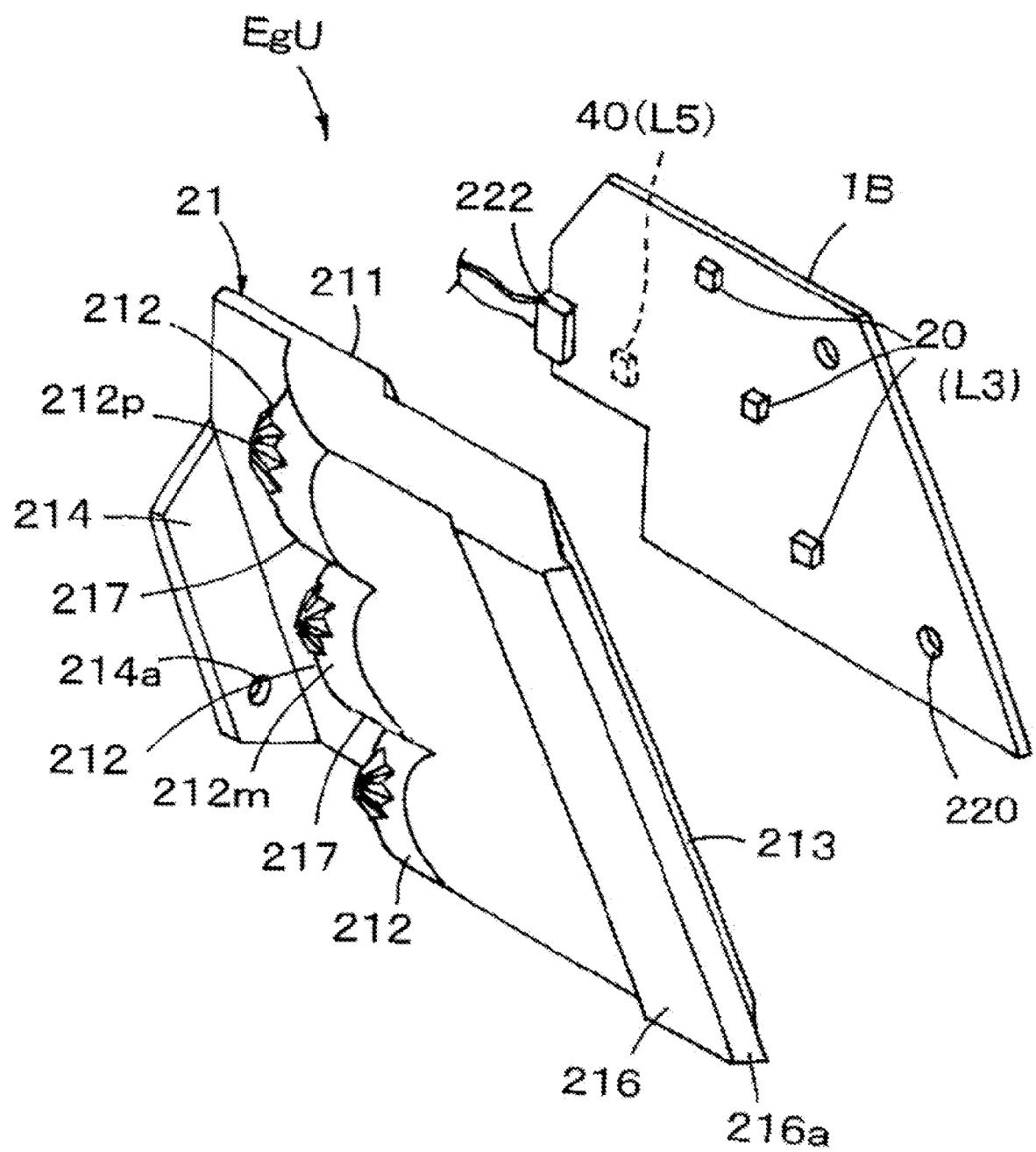
FIG. 6 is an exploded perspective view schematically showing a configuration of an edge lamp unit.
Figure 7:
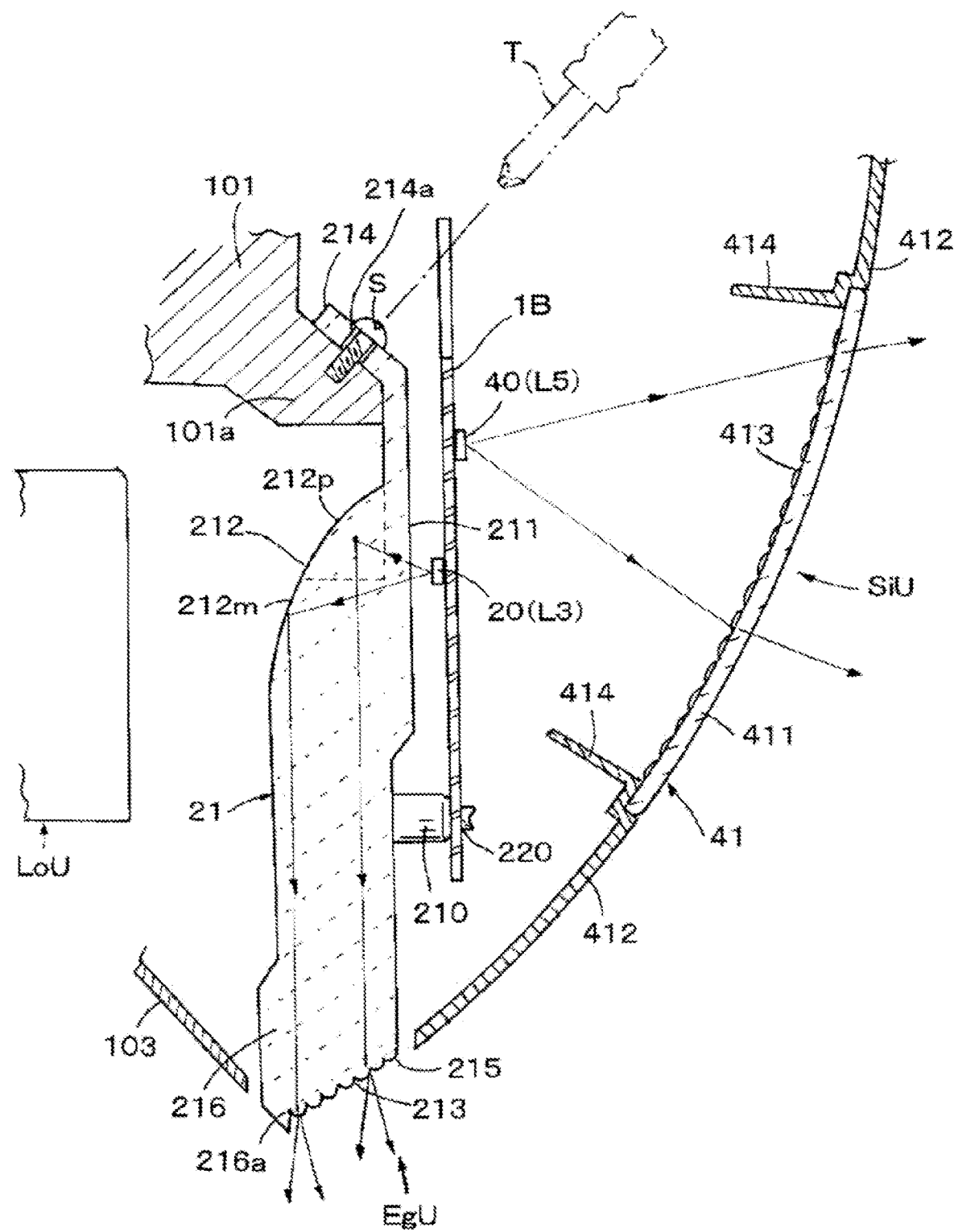
FIG. 7 is a horizontal cross-sectional view showing the edge lamp unit and a side lamp unit in a lamp housing.

FIG. 6 is an exploded perspective view schematically showing a configuration of the edge lamp unit, and FIG. 7 is a cross-sectional view showing the edge lamp unit in the lamp housing 100. The side lamp unit SiU is additionally shown in FIG. 7. As shown in FIGS. 6 and 7, the edge lamp unit EgU includes: the third light source L3; and an edge light guide 21. The edge light guide 21 is an example of a light guide and an optical system.

The edge light guide 21 is configured with a light-guiding plate that has a substantially plate shape and is made of a translucent resin material. The edge light guide 21 is supported by the lamp body 101 as will be described later. The edge light guide 21 extends along the front-rear direction of the left bead lamp L-HL such that plate surfaces on both sides of the edge light guide 21 are vertical surfaces that are substantially opposite to each other in the left-right direction. In the following, an outer plate surface in the vehicle width direction is referred to as an outer surface, and the opposite or inner plate surface in the vehicle width direction is referred to as an inner surface. A direction in which the edge light guide 21 extends is referred to as an optical axis direction.

The third light source L3 includes white LEDs 20 mounted on a B-substrate 1B placed adjacent to the edge light guide 21 along the outer surface of the edge light guide 21. The B-substrate 1B is integrally coupled to the edge light guide 21 along the outer surface of the edge light guide 21. In this embodiment, a snap 210 is integrally formed with the edge light guide 21, and the snap 210 is configured to engaged with a connection hole 220 on the B-substrate 1B. Preferably, the B-substrate 113 covers the outer surface of the edge light guide 21 widely as long as that does not interfere in placement of the edge light guide 21 in order to improve light-blocking properties to be described later.

The white LEDs 20 as the third light source L3 are mounted on a surface of the B-substrate 1B on which the B-substrate 1B faces the outer surface of the edge light guide 21. In this embodiment, three white LEDs 20 are placed at a predetermined interval in the vertical direction such that they are slightly shifted in the front-rear direction. The white LEDs 20 are configured to cause light to be incident on the outer surface of the edge light guide 21. The B-substrate 1B is electrically connected to the lamp ECU 5 via a connector 222.

Apart of the outer surface of the edge light guide 21 on which the light from the third light source L3 is incident is configured as an incident surface 211. On the inner surface of the edge light guide 21 opposite to the outer surface, reflection surface 212 configured to reflect the incident light internally is placed. A front end surface of the edge light guide 21 facing a front side is configured as an emission surface 213 configured to emit light internally reflected by the reflection surface 212. The emission surface 213 inclines rearward in the vertical direction along a front surface of the translucent cover 102 and inclines in a horizontal direction outwardly in the vehicle width direction.

A rear end portion of the outer surface of the edge light guide 21 that aces the white LEDs 20 as the third light source L3 is slightly thicker than a portion anterior to the rear end portion. The rear end portion is configured as the incident surface 211. Light from the third light source L3 travels onto the incident surface 211.

As shown in FIG. 6, the reflection surface 212 of the edge light guide 21 is on an inner surface opposite to the incident surface 211. The reflection surface 212 includes three reflection surface sections arranged in the vertical direction correspondingly to the three white LEDs 20 as the third light source L3. In this embodiment, since the three white LEDs 20 are sequentially shifted forward from the top to the bottom, the three reflection surface sections are also sequentially shifted forward from the top to the bottom in a terraced manner corresponding to the three white LEDs 20. In the following, the reflection surface 212 may be referred to as one or all of the reflection surface sections generically.

Figure 8A:
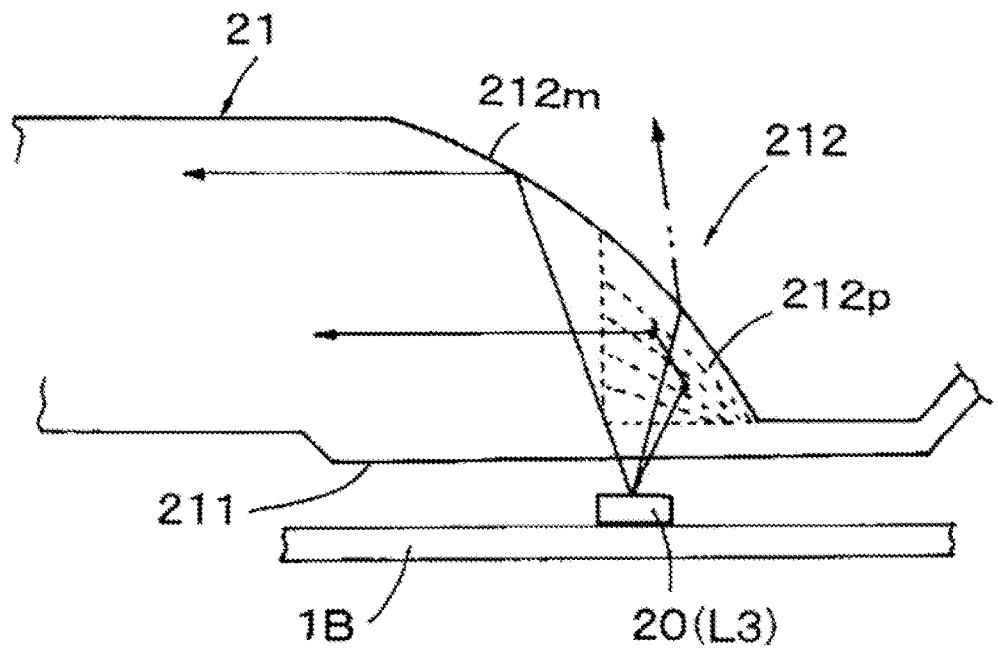
FIG. 8A is a cross-sectional view showing the edge light guide in a reflection surface.

Since the three reflection surface sections are similar to each other, only one of them will be described. FIG. 8A is a cross-sectional view showing the edge light guide 21 in the reflection surface 212. A virtual focal point of the inner surface of the edge light guide 21 as the incident surface 211 is basically in the vicinity of the corresponding white LED 20. The inner surface of the edge light guide 21 is formed by a part of a paraboloid whose central axis is a virtual line that passes through the virtual focal point and extends in the front-rear direction. Accordingly, light incident on the incident surface 211 from the white LEDs 20 is internally reflected by the reflection surface 212 and is guided in the optical axis direction to the front end surface configured as the emission surface 213.

Light satisfying a condition of a critical angle determined based on a refractive index of translucent resin of the edge light guide 21 out of light projected onto an inner surface of the reflection surface 212 is totally reflected on the inner surface and is guided to the emission surface 213. On the other hand, since light projected onto a rear end portion of the reflection surface 212 of the edge light guide 21 is incident on the inner surface at a small angle such that the condition is not satisfied, the light leaks outside the edge light guide 212 from the reflection surface 212 as shown by a chain line without total reflection.

Figure 8B:
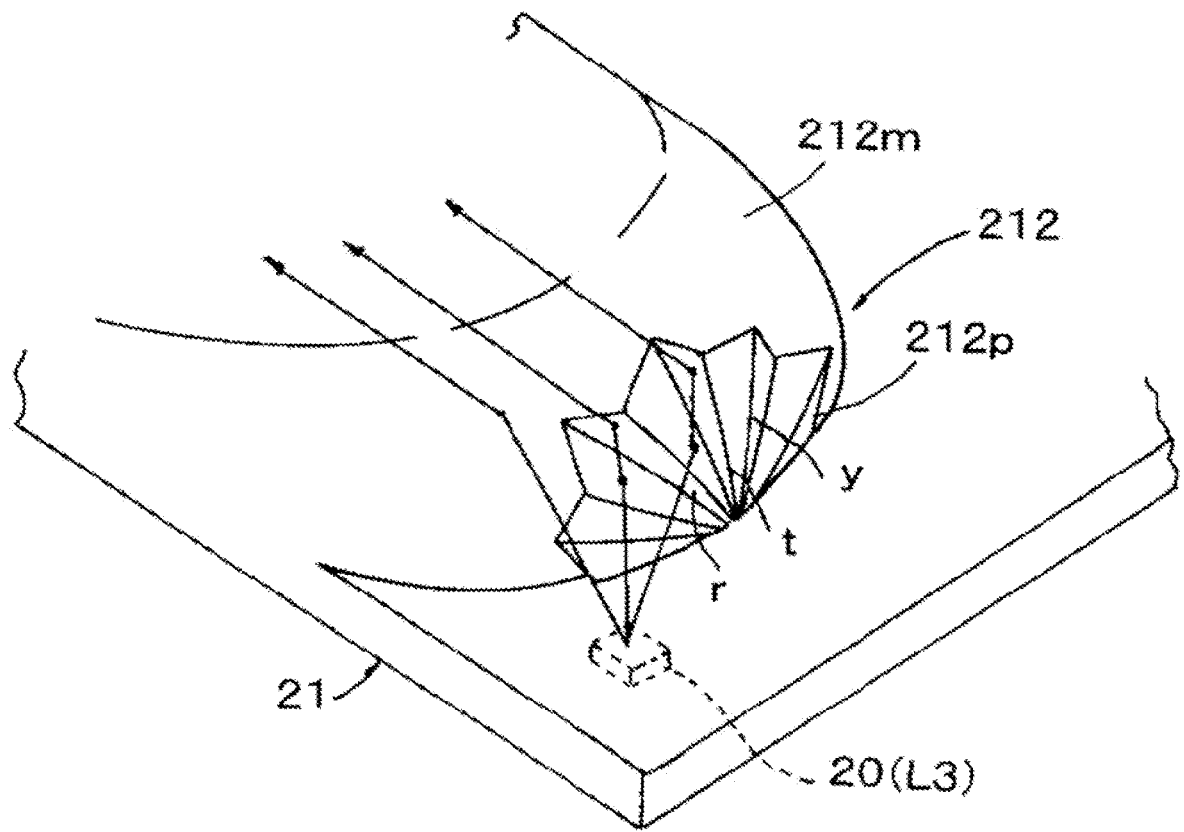
FIG. 8B is a perspective view showing an exterior of the edge light guide shown in FIG. 8A.

Therefore, the reflection surface 212 that satisfies the condition has a shape of the paraboloid as a single-reflection surface 212m on which light is reflected once. On the other hand, the reflection surface that does not satisfy the condition is configured as a multiple-reflection surface 212p. FIG. 8B is a perspective view showing the exterior of the multiple-reflection surface 212p. The multiple-reflection surface 212p has mountain (ridge) lines y and valley lines t extending from the virtual focal point to form a fan shape. A cross-sectional view of the multiple-reflection surface 212p in the circumferential direction is shaped like a triangle wave. The mountain lines y extend along paraboloids, and the valley lines t extend along paraboloids whose parameters are different from that of the mountain lines y. Therefore, slopes r choppily arranged in the fan shape are configured such that the paraboloids incline alternately in the circumferential direction.

On the slopes r of the multiple-reflection surface 212p, surface angles in the circumferential direction with respect to the incident surface 211 increase. Since an incident angle in the circumferential direction of incident light reaching each slope r increases, the incident light satisfies the condition and is internally reflected (primary internal reflection). The internally reflected light reaching an adjacent or distant slope r is internally reflected (secondary internal reflection) since the condition is satisfied again. Since slopes r incline along the parabola in the optical axis direction, light internally reflected through the primary, secondary, and so forth internal reflection faces approximately in the optical axis direction.

Therefore, in the edge light guide 21, some light reaching the incident surface 211 is guided toward the emission surface 213 through the primary internal reflection on the single-reflection surface 212m. The rest of the light is guided toward the emission surface 213 through multiple reflections such as the primary and secondary internal reflections on the multiple-reflection surface 212p. Consequently, it is possible to prevent light from leaking outside the edge light guide 21 from the reflection surface 212, thereby increasing reflection efficiency of light on the reflection surface 212.

Figure 9A:
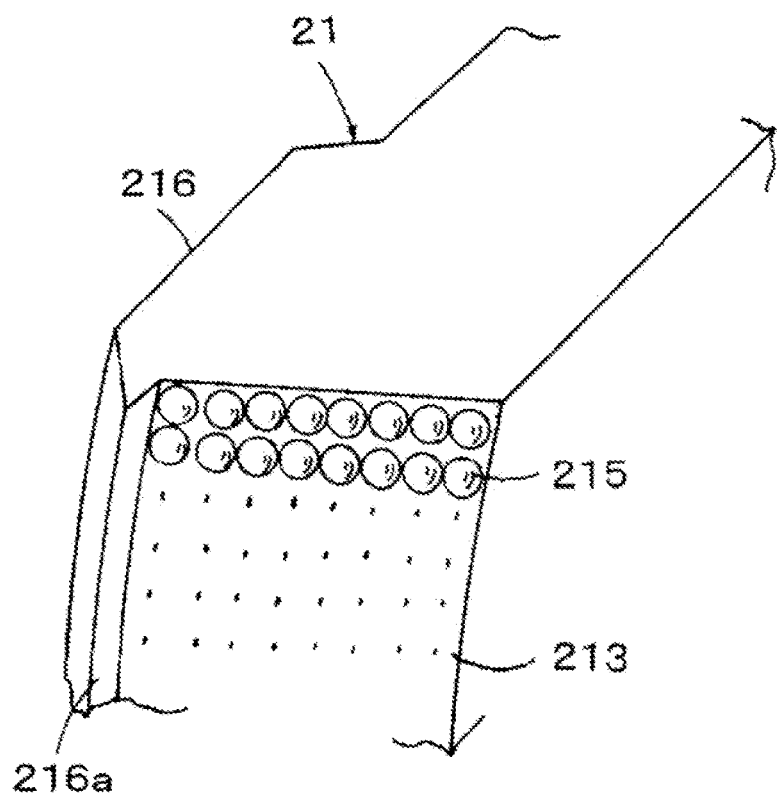
FIG. 9A is a perspective view schematically showing an emission surface.

In the edge light guide 21, light from the white LEDs 20 corresponding to the three reflection surface sections is internally reflected to the optical axis direction and is emitted from the emission surface 213. FIG. 9A is a perspective view schematically showing the emission surface 213. Refraction steps 215 configured to refract light diffusely are formed on a front end of the emission surface 213. In this embodiment, a large number of minute spherical steps are arranged as the refraction steps 215. Since the refraction steps 215 are provided, light reflected by one of the three reflection surface sections to the optical axis direction is refracted by the refraction steps 215 and is emitted diffusely toward a desired wide region ahead of the automobile, as shown in the cross-sectional view of FIG. 9B.

Further, in the edge light guide 21 according to this embodiment, a lateral emission step 216 protruding inward in the vehicle width direction is provided in a front end side of the inner surface of the edge light guide 21, which is along one edge portion of the emission surface 213, as shown in FIG. 9A. A horizontal cross section of the lateral emission step 216 has trapezoidal shape protruding from the inner surface, and a wedge-shaped portion 216a on a lower base positioned at a front side in the optical axis direction protrudes forward from the emission surface 213. The lateral emission step 216 extends along the emission surface 213 of the edge light guide 21 substantially over the entire length in the vertical direction.

Figure 9B:
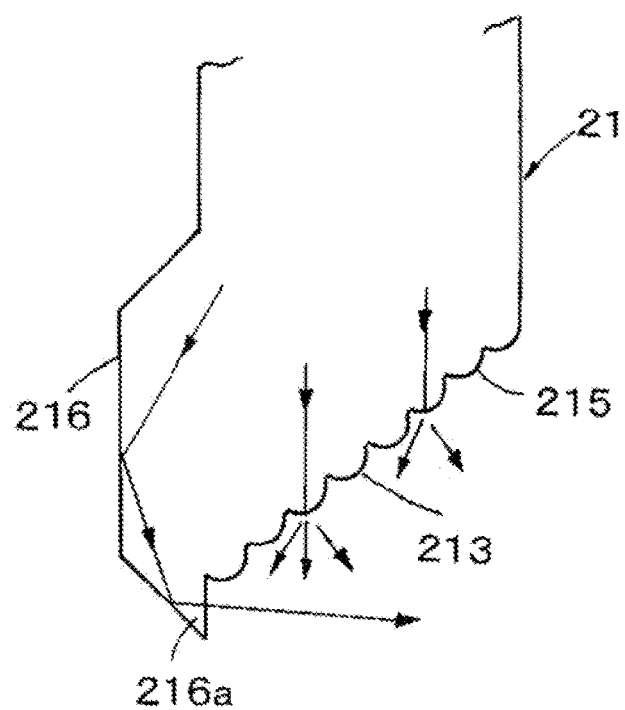
FIG. 9B is a cross-sectional view corresponding to FIG. 9A.

Accordingly, most light reflected by the reflection surface 212 faces in the optical axis direction of the edge light guide 21, but some of the light inclines from the optical axis direction and is not emitted from the emission surface 213 suitably, as shown in FIG. 9B. When such light is guided to the lateral emission step 216, the light is reflected by an upper base of the lateral emission step 216 and/or front or rear inclined surface thereof and is emitted from the wedge-shaped portion 216a, which protrudes forward from the emission surface 213. In the wedge-shaped portion 216a, light is reflected by an inner surface of the wedge-shaped portion 216a and is emitted toward the left side of the left head lamp L-HL in a direction inclined toward the outer side in the vehicle width direction from the optical axis direction of the edge light guide 21. In this way, the lateral emission step 216 is configured to reflect light guided to an edge of the edge light guide 21 in a thickness direction of the edge light guide 21 and to emit the light in the thickness direction of the edge light guide 21. The emission surface 213 inclines in the thickness direction of the edge light guide 21 from one edge of the edge light guide 21 in which the lateral emission step 216 is provided to the other edge.

Since light widely emitted from the refraction steps 215 of the emission surface 213 and light emitted outwardly in the vehicle width direction from the lateral emission step 216 are combined, the edge lamp unit EgU can emit light extremely widely.

As described above, the three reflection surface sections are arranged in a terraced manner along the inclination direction of the emission surface 213. That is, as schematically shown in a vertical cross-sectional view of a structure of the edge light guide 21 in FIG. 10A, the three reflection surface sections are sequentially shifted forward from the top to the bottom. Therefore, boundary surfaces 217 extending along the optical axis direction are formed between the reflection surface sections. In other words, the boundary surfaces 217 extending in a direction intersecting the inclination direction of the reflections surface 212 are formed. Some light that is not internally reflected in the optical axis direction by each of the reflection surface sections is incident on the boundary surfaces 217.

Figure 10A:
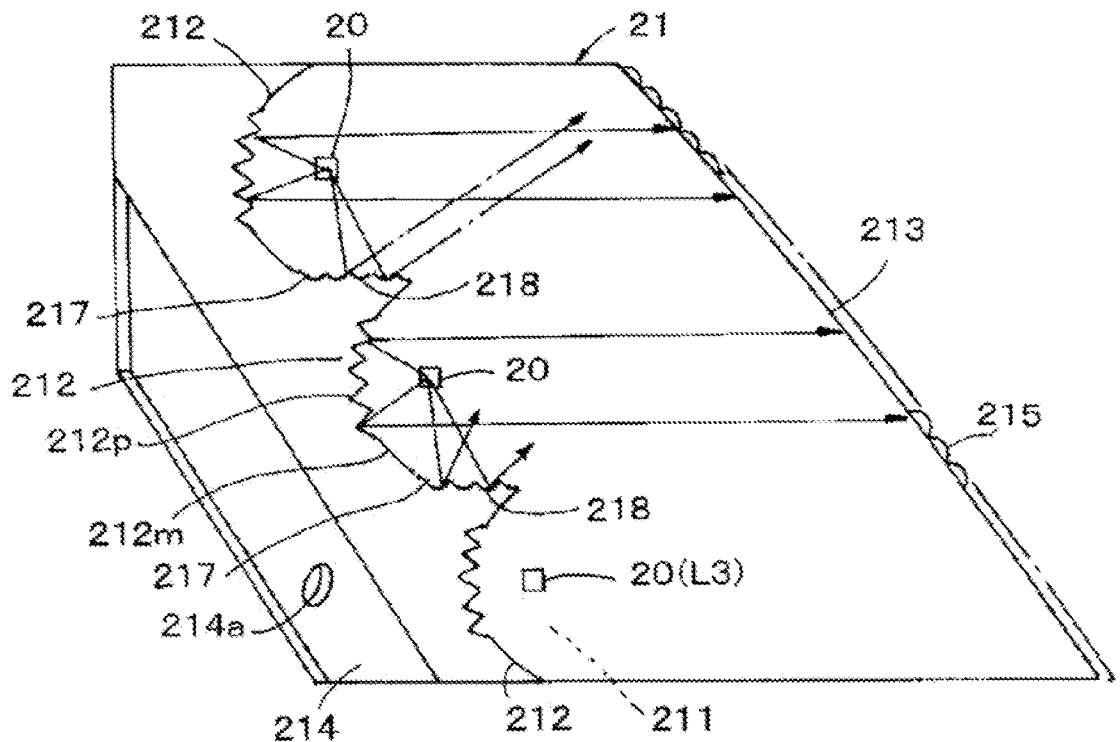
FIG. 10A is a vertical cross-sectional view schematically showing a structure of the edge light guide.

If the boundary surfaces 217 were flat, such light is specularly internally reflected on the boundary surfaces 217 as shown by chain lines. FIG. 10A shows an example of reflection on the upper boundary surface 217. The internally reflected light is guided upward at a desired angle from the optical axis direction and is emitted from the emission surface 213. Since the light is superposed on light reflected by each reflection surface 212 toward the optical axis direction, brightness of the emission surface is high in such a region. On the other hand, the brightness of the emission surface is relatively low outside the region. Such uneven brightness of the emission surface deteriorates the exterior of the lamp when turned on.

Figure 10B:
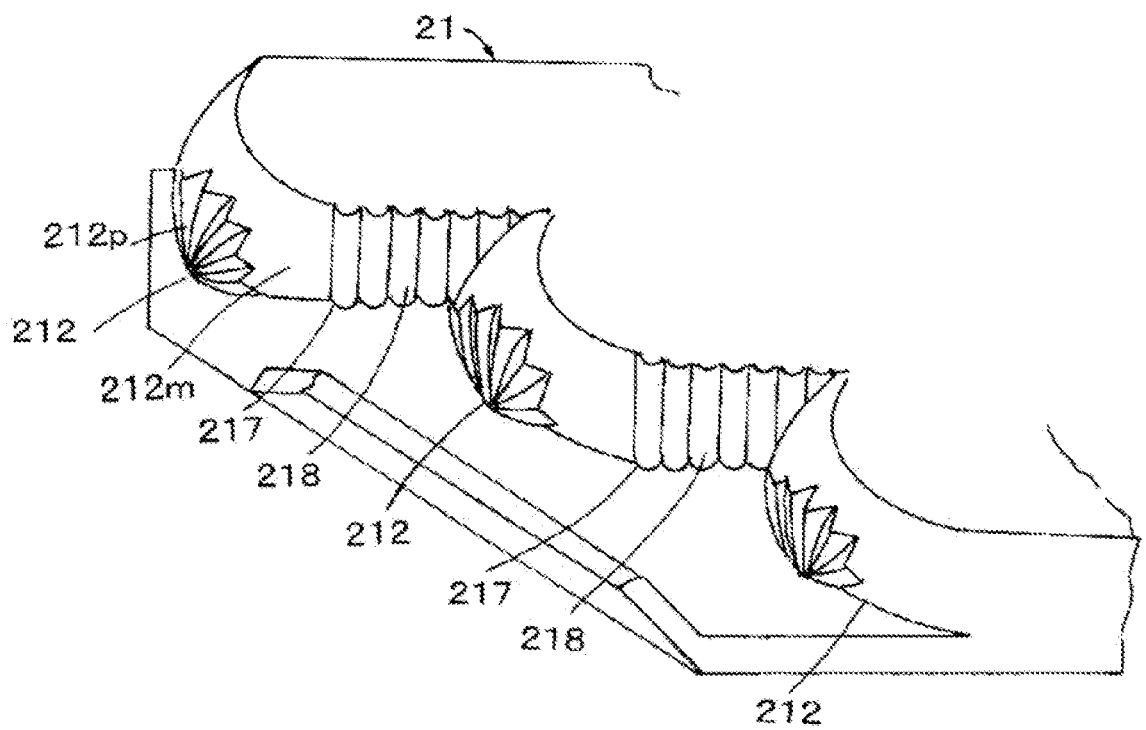
FIG. 10B is a perspective view schematically showing a part of the edge light guide.

In the present disclosure, the boundary surfaces 217 are provided with reflection steps 218 configured to reflect light diffusely as schematically shown in a perspective view of FIG. 10B. In this embodiment, the reflection steps 218 are configured with semicylindrical optical step whose cross-sectional view in an axial direction protrudes downward in a semicircular shape and that extends in the thickness direction of the edge light guide 21.

Since the reflection steps 218 are provided, light projected onto an inner surface of the boundary surfaces 217 is diffusely reflected by the reflection steps 218 relatively widely to the optical axis direction and is guided in the edge light guide 21. An example of reflection on the lower boundary surface 217 is shown by solid lines in FIG. 10A. The light, guided to the emission surface 213 is superposed on light guided from the reflection surface 212. Consequently, light is equalized over a desired region in an upper-lower direction of the emission surface 213 to avert uneven brightness of the emission surface 213, thereby improving the exterior when the edge lamp unit EgU is turned.

Since the boundary surfaces 217 are provided with the reflection steps 218, it is possible to reduce light that passes through the boundary surfaces 217 and leaks from the edge light guide 21, thereby realizing efficient use of light from the white LEDs 20 (the third light source L3). The reflection steps 218 may be optical steps, for example, having a knurled structure as long as they are configured to emit light divergently or diffusely.

The edge light guide 21 is supported by the lamp body 101 as described above. For this support, the edge light guide 21 includes a supporting piece 214 extending further rearward from a rear end surface of the edge light guide 21. In other words, the supporting piece 214 extends from the reflection surface 212 of the edge light guide 21 in a direction opposite to the emission surface 213. The supporting piece 214 is formed into a thin plate whose thickness corresponds approximately to that of the incident surface 211, which makes the edge light guide 21 thicker. The supporting piece 214 is bent inwardly at a desired angle, for example, about 120°, with respect to the optical axis direction. In other words, the supporting piece 214 is bent in the thickness direction of the edge light guide 21. A threaded hole 214a in the thickness direction is opened in the supporting piece 214.

A part of the lamp body 101 that supports the edge light guide 21 is configured as a fixing portion 101a for contact with the supporting piece 214. As shown in FIG. 7, when the edge light guide 21 is supported, the fixing portion 101a of the lamp body 101 is fastened with a screw S inserted into the threaded hole 214a using a tool T such as a screwdriver.

Since the supporting piece 214 inclines from the optical axis direction, the screwdriver T can be inserted through a cut in the B-substrate 1B, thereby enabling easy fastening of the screw S. If a corner angled similarly to the supporting piece 214 is provided in the fixing portion 101a, the supporting piece 214 can touch the fixing portion 101a to fix the edge light guide 21 stably.

Since the supporting piece 214 is thinner, light incident on the incident surface 211 is prevented from being guided toward the supporting piece 214, and most of the incident light is guided toward the reflection surface 212. Even if light is guided toward the supporting piece 214, the light is reflected forward on a bent of the supporting piece 214 toward the emission surface 213. Consequently, efficient use of light from the third light source L3 in the edge lamp unit EgU can be realized.

Rod Lamp Unit RoU

Figure 11A:
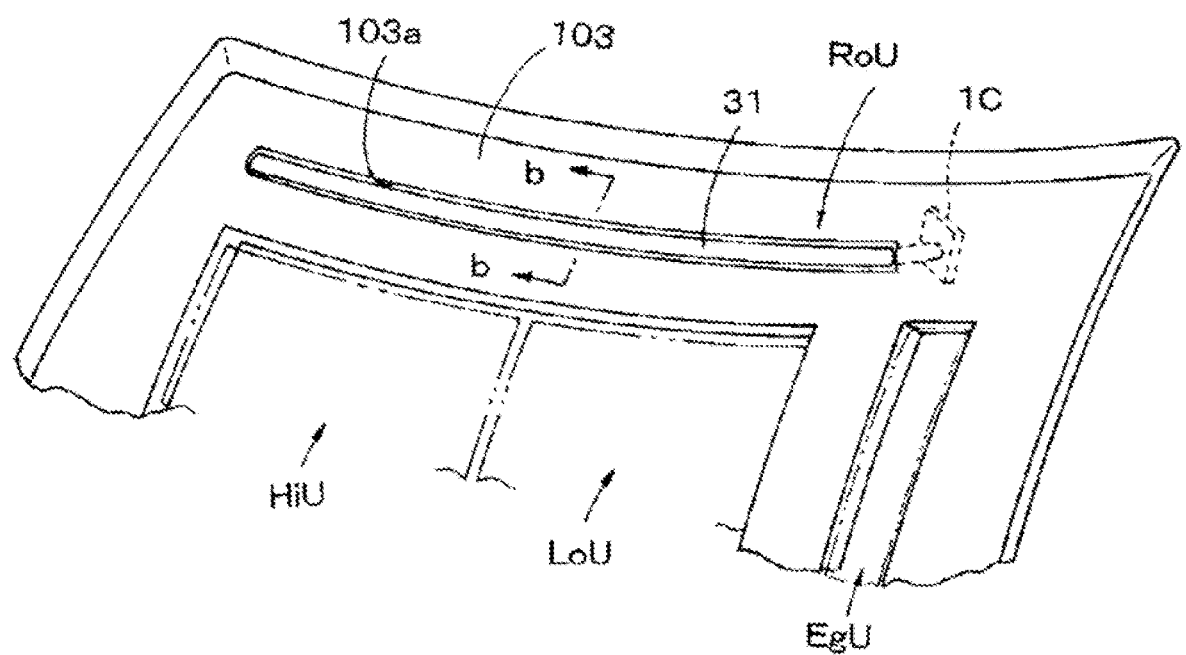
FIG. 11A is a perspective view schematically showing a rod lamp unit.
Figure 11B:
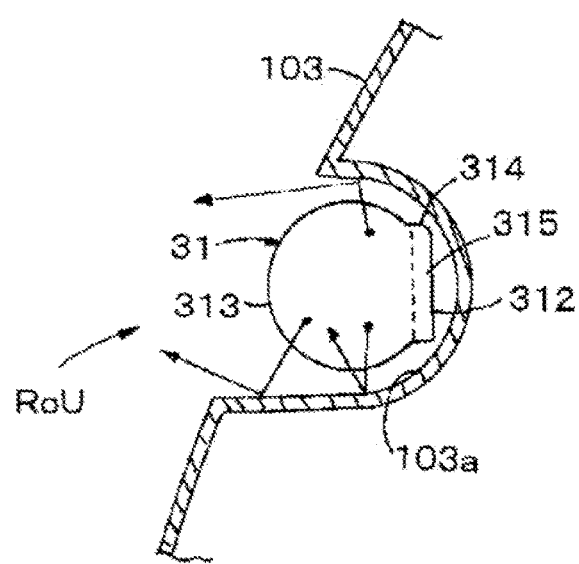
FIG. 11B is a cross-sectional view taken along a line b-b shown in FIG. 11A.

FIG. 11A is a perspective view schematically showing a configuration of the rod lamp unit RoU, and FIG. 11B is a cross-sectional view taken along a line shown in FIG. 11A. The rod lamp unit RoU includes: the fourth light source L4; and a rod light guide 31. The rod light guide 31 is configured as a cylindrical light-guiding rod made of a translucent resin material and extends in the left right direction curvedly along upper edges of the low-beam lamp unit LoU and the high-beam lamp unit HiU. In other words, the rod lamp unit RoU and the edge lamp unit EgU are parallel to a circumferential direction of the low-beam lamp unit LoU and the high-beam lamp unit HiU and are placed around the low-beam lamp unit LoU and the high-beam lamp unit HiU. In this embodiment, a groove 103a that is opened forwardly and is extends in the left-right direction is formed on a front surface of the extension 103. The rod light guide 31 is accommodated in and supported by the groove 103a for the most part. The rod light guide 31 is an example of an optical system.

Figure 12A:
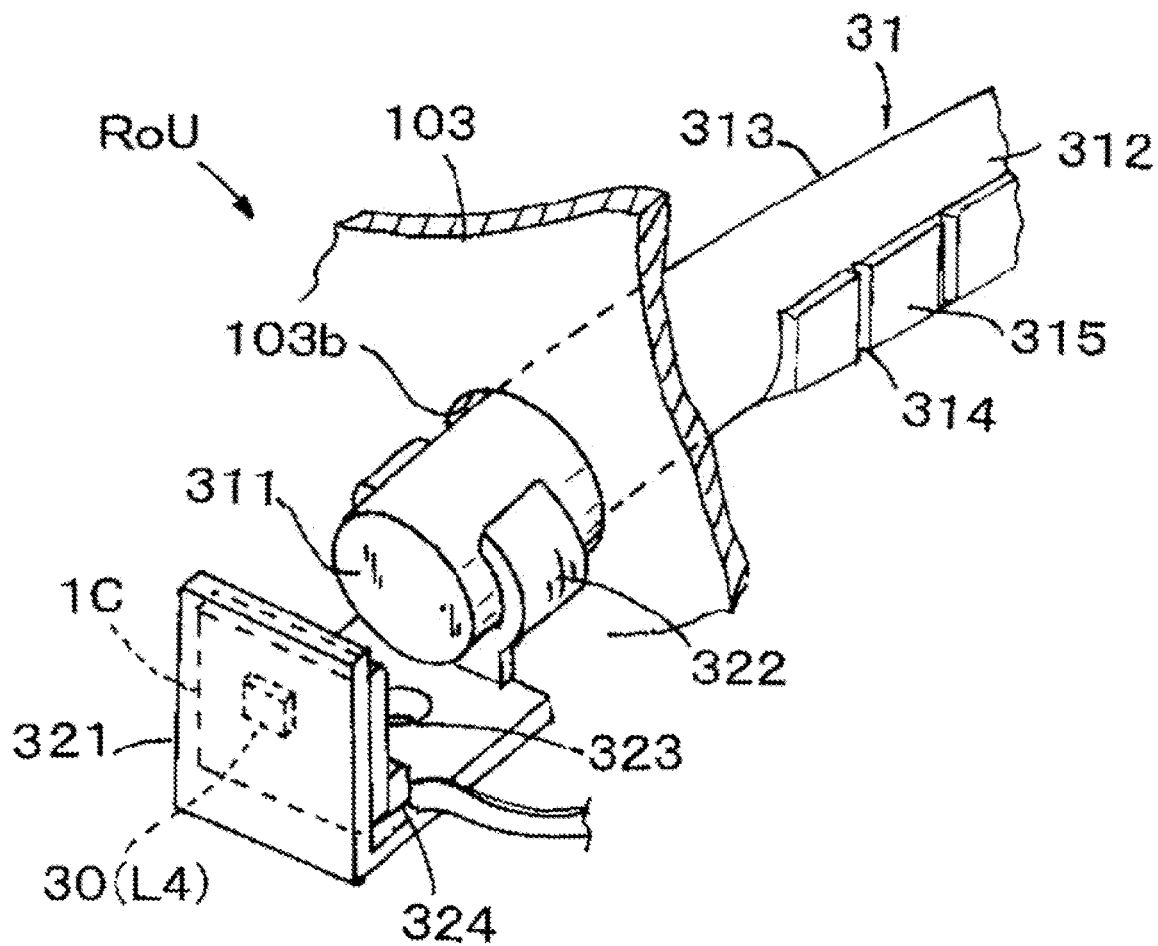
FIG. 12A is a view showing an exterior of a part of the rod lamp unit.

FIG. 12A is a perspective view schematically showing one end portion of the rod light guide 31 in the lengthwise direction. The rod light guide 31 extends to the reverse side through a hole 103b provided in the extension 103. A C-substrate 1C is supported by a holder 321 at one end of the rod light guide 31. The fourth light source L4 is supported by the C-substrate 1C. The holder 321 is configured to hold the rod light guide 31 with a holding piece 322 provided in the holder 321. The holder 321 is fixed to the lamp body 101 by a screw or the like (not shown) inserted through a threaded hole 323, thereby the rod light guide 31 also supported by the lamp body 101.

The C-substrate 1C is supported by the holder 321 such that the C-substrate 1C and a white LED 30 as the fourth light source L4 mounted on the C-substrate 1C face an end surface of one end of the rod light guide 31. The C-substrate 1C is electrically connected to the lamp ECU 5 via a connector 324. The white LED 30 is configured to emit light to be incident on the end surface of the rod light guide 31.

The end surface of the rod light guide 31 is configured as an incident surface 311 on which the light from the white LED 30 as the fourth light source L4 is incident. A circumferential surface region facing a rear side of the rod light guide 31, that is, a region extending in the lengthwise direction of the rod light guide along an inner bottom surface of the groove 103a is configured as a reflection surface 312 is configured to reflect the light incident on the rod light guide 31 internally. On the other hand, a circumferential surface region on a front side of the rod light guide 31 facing the reflection surface 312, that is, a circumferential surface region exposed from the opening of the groove 103a is configured as an emission surface 313 configured to emit the light reflected be the reflection surface 312.

In the rod lamp unit RoU, when the white LED 30 as the fourth light source L4 emits light, the light from the white LED 30 is incident on the incident surface 311 of the rod light guide 31. The incident light is guided in the lengthwise direction of the rod light guide 31 through repeated internal reflections inside the rod light guide 31 and is internally reflected forward sequentially by the reflection surface 312.

Figure 12B:
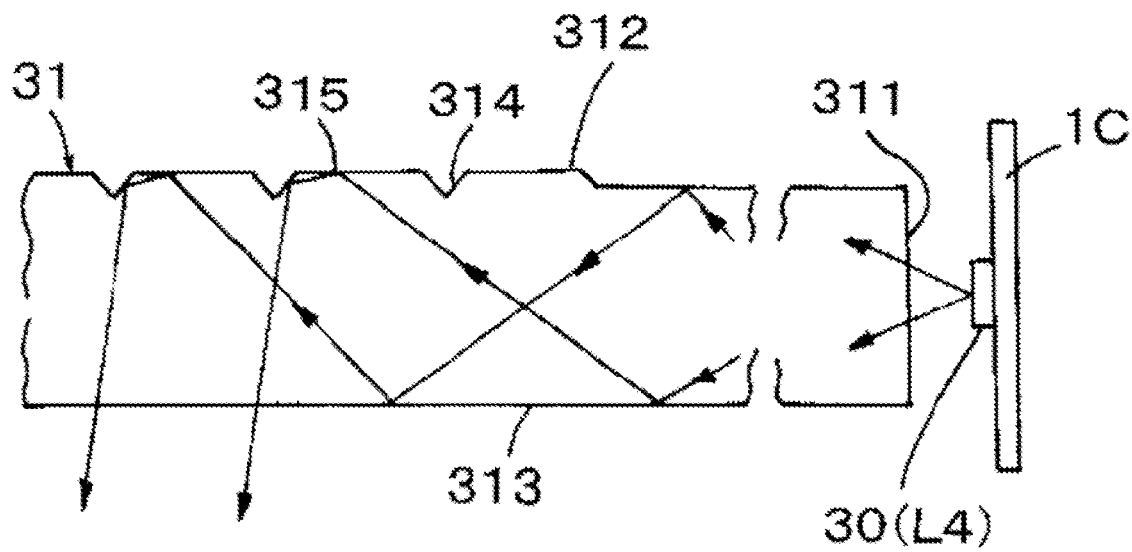
FIG. 12B is a cross-sectional view schematically showing a rod light guide.

The reflection surface 312 is configured with a plurality of reflecting elements placed at a desired interval along the lengthwise direction of the rod light guide 31, as schematically shown in a partial cross-sectional view in FIG. 12B. That is, a plurality of V-shaped grooves 314 are placed at a desired interval from a circumferential surface on a rear side of the rod light guide 31 to the front, and a trapezoidal reflection step 315 is formed between V-shaped grooves 314 adjacent in the lengthwise direction. In this embodiment, a circumferential surface region on the rear side of the rod light guide 31 is formed into a flat surface extending in a tangential direction, in which the reflection steps 315 are provided by forming the V-shaped grooves 314.

Light that is incident on the rod light guide 31 from the incident surface 311 and is projected onto an inner surface of the reflection surface 312 is reflected by an upper bottom surface of the trapezoidal reflection steps 315 or inclined surfaces adjacent thereto. The reflected light is incident on the emission surface 313 in a circumferential region on the front side of the rod light guide 31 and is emitted forward therefrom for the most part. Some light reflected by the reflection surface 312 travels toward a circumferential region on an upper or lower side of the rod light guide 31 and is internally reflected in the circumferential region to be emitted from the emission surface 313.

Although some light may leak from the rod light guide 31 to the outside as shown in FIG. 11B, such light is reflected by an inner surface of the groove 103a of the extension 103 and is incident on the rod light guide 31 again. Consequently, the light is emitted from the emission surface 313. Alternatively, such light is reflected by the inner surface of the groove 103a and is simply emitted forward. Therefore, light guided through the rod light guide 31 is emitted forward for the most part, thereby realizing efficient use of light from the fourth light source L4.

If an angle of the V-shaped grooves 314 is set appropriately, an incident angle of light reflected on the upper bottom surfaces or the inclined surfaces of the trapezoidal reflection steps 315 can be large, especially larger than the critical angle. Consequently, it is possible to reduce light leaking from the rod light guide 31 through the reflection surface 312 to the outside, thereby increasing reflection efficiency of light on the reflection surface 312 and realizing efficient use of light from the emission surface 313. Furthermore, since guiding efficiency of light in the lengthwise direction of the rod light guide 31 increases, light can be emitted widely in the lengthwise direction of the rod light guide 31 uniformly.

In the rod lamp unit RoU and the edge lamp unit EgU, which was described previously, when the lamp on/off switch SW1 is turned on, the third light source L3 and the fourth light source L4 are basically controlled to emit light simultaneously. The edge lamp unit EgU is turned on as a lamp having the same function, that is, as an auxiliary lamp such that the emission surface 213 of the edge light guide 21 and the emission surface 313 of the rod light guide 31 are combined to from an upside-down-L-shaped light-emitting surface.

Figure 13A:
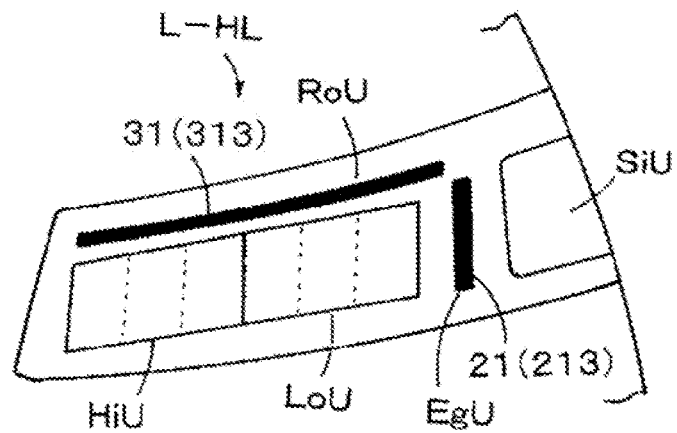
FIG. 13A is a front view schematically showing a light-guide-type lamp unit when lighting up.
Figure 13B:
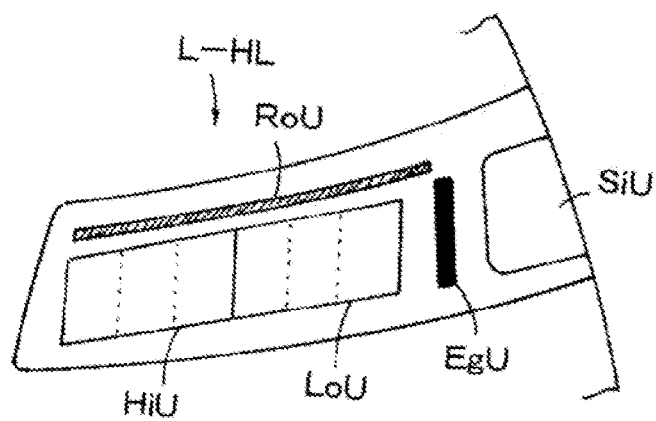
FIG. 13B is a front view schematically showing the light-guide-type lamp unit when lighting up.
Figure 13C:
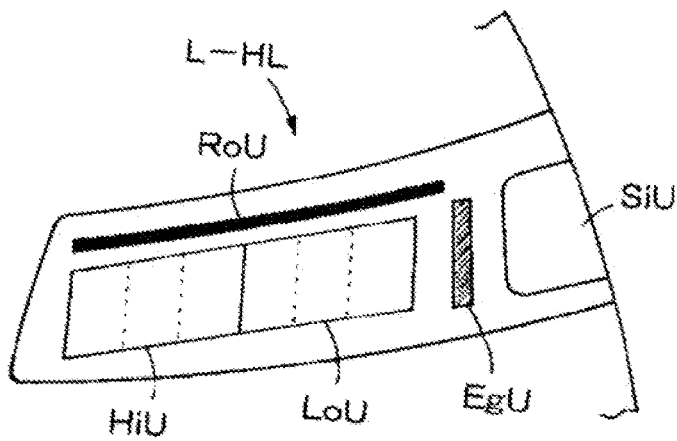
FIG. 13C is a front view schematically showing the light-guide-type lamp unit when lighting up.

If the function switch SW3 is switched to a clearance lamp, white light with desired brightness is emitted from the emission surface of the edge light guide 21 and the emission surface of the rod light guide 31 to turn on the lamp units RoU and EgU as schematically shown in FIG. 13A. In FIGS. 13A to 13C, depth of shades represents brightness for the sake of convenience. Therefore, the edge lamp unit EgU and the rod lamp unit RoU are turned on as a clearance lamp such that the emission surface 213 of the edge light guide 21 and the emission surface 313 of the rod light guide 31 are combined to form the upside-down-L-shaped light-emitting surface as viewed from a front side of the head lamp HL (L-HL).

That is, a light-emitting surface of the edge lamp unit EgU that has a relatively large width and extends in the upper-lower direction and a light-emitting surface of the rod lamp unit RoU that has a relatively small width and extends in the left-right direction are combined. Therefore, the light-emitting surface has a complex shape for good design as compared to a lamp in which only edge lamp units or rod lamp units are combined.

If the function switch SW3 is switched to the daytime running lamp, brightness of the third light source L3 and the fourth light source L4 gets higher. Consequently the edge lamp unit 21 and the rod lamp unit 31 are turned on as the daytime running lamp more brightly than as the clearance lamp.

In this mode, it is preferable that brightness of the light-emitting surface of the edge lamp unit EgU be equal to brightness of the light-emitting surface of the rod lamp unit RoU. In this case, for example, the edge light guide 21 and the rod light guide 31 are designed such that quantities of emitted light per unit area of the emission surfaces 213 and 313 are equal to each other. In this embodiment, the third light source L3 of the edge lamp unit EgU includes three white LEDs 20, and the fourth light source L4 of the rod lamp unit RoU includes one white LED 30. Light quantity from the white LEDs 20 can be equal to light quantity from the white LED 30 if the emission surface 213 of the edge light guide 21 is designed to be three times larger than the emission surface 313 of the rod light guide 31.

As shown in FIG. 3, since the lamp ECU 5 includes the lighting adjuster 52 configured to adjust brightness of the third light source L3 and the fourth light source L4, the brightness of the light sources L3 and L4 may be adjusted by checking brightness of light-emitting surfaces of the lamp units EgU and RoU when the edge lamp unit EgU and the rod lamp unit RoU are turned on and changing currents supplied to the light sources L3 and L4 by the lighting adjuster 52.

For example, when the function switch SW3 is switched and the edge lamp unit EgU and the rod lamp unit RoU are turned on as a clearance lamp, the third light source L3 may emit light with a predetermined brightness and the fourth light source L4 with lower brightness than the predetermined brightness, as shown in FIG. 13B. In this case, the edge lamp unit EgU is turned on brightly, and the rod lamp unit RoU is turned on less brightly than the edge lamp unit EgU. When the edge lamp unit EgU and the rod lamp unit RoU are turned on as a daytime running lamp, the third light source L3 and the fourth light source L4 may emit light with the same brightness to turn on the edge lamp unit EgU and the rod lamp unit RoU with the same brightness.

On the contrary, when the clearance lamp is turned on, the fourth light source L4 emits light with the predetermined brightness, and the brightness of the third light source L3 may be reduced as shown in FIG. 13C such that the brightness of the rod lamp unit RoU when the rod lamp unit RoU is turned on gets higher than that of the edge lamp unit EgU. In this case, when the daytime running lamp is turned on, the third light source L3 and the fourth light source L4 emit light with the same brightness to turn on the edge lamp unit EgU and the rod lamp unit RoU with the same brightness.

Alternatively, depending on the circumstances, one of the edge lamp unit EgU or the rod lamp unit RoU (for example, only the rod lamp unit RoU) may be turned on as the clearance lamp and the other one (for example, only the edge lamp unit EgU) as the daytime running lamp, or vice versa.

If the edge lamp unit EgU and the rod lamp unit RoU are selectively turned on as described above, the lighting adjuster 52 may adjust brightness of the edge lamp unit EgU to be equal to rod lamp unit RoU or may adjust brightness of the edge lamp unit EgU and the rod lamp unit RoU to be higher than the predetermined brightness. That is, the lamp unit are adjusted such that each lamp unit alone emits light with brightness required for the clearance lamp or the daytime running lamp.

Since light guided in the rod light guide 31 from the incident surface 311 to an opposite end (an inner end in the vehicle width direction, in this embodiment) is gradually attenuated, brightness may be uneven in the lengthwise direction. This may be resolved by, for example, reflection steps 315 increasing in size as they are placed from the incident surface to the opposite end. That is, reflection efficiency can be increased toward the opposite end of the rod light guide 31 to compensate for attenuation by gradually increasing intervals in the lengthwise direction between the V-shaped grooves 314.

Alternatively, an end surface of the opposite end of the rod tight guide 31 may be configured as an incident surface. In this case, another fourth light source is provided such that it faces the opposite incident surface, and light is incident on both ends of the right guide. Since light incident from one end of the rod light guide is superposed on light incident from the other end of the rod light guide to be reflected and emitted, it is possible to equalize brightness in the lengthwise direction.

If the rod lamp unit RoU is housed in the lamp housing 100 and the incident surface 311 of the rod light guide 31 is placed close to the B-substrate 1B, the incident surface 311 may be placed such that the incident surface 311 faces the B-substrate 1B on which the white LED 30 as the fourth light source L4 mounted. In this case, the C-substrate 1C described above can be omitted. Alternatively, the incident surface 311 may be placed such that the incident surface 311 faces the A-substrate 1A on which the white LED 30 as the fourth light source L4 mounted.

Positions of the edge lamp unit EgU and the rod lamp unit RoU can interchange as appropriate. Although the edge lamp unit EgU and the rod lamp unit RoU are placed over side and upper regions around the low-beam lamp unit LoU and the high-beam lamp unit HiU in the present embodiment, the present invention is not limited thereto. Light-emitting surfaces of the lamp units EgU and RoU, that is, the light guides 21 and 31 may be combinedly arranged in the circumferential direction.

The configuration of the edge lamp unit EgU and/or the rod lamp unit RoU may be modified as appropriate. For example, at least one of the lamp units may include a plurality of lamp units. The number of light guides in each lamp unit may be changed. For example, the rod lamp unit RoU may be configured as a lamp unit in which a plurality of rod light guides 31 are arranged in parallel or in series.

Accordingly, since the edge lamp unit EgU and the rod lamp unit RoU are placed in the composite head lamp HL and these lamp units EgU and RoU are turned on as lamps having the same or different functions, design effect when the lamps are turned on is improved as compared to a lamp in which only edge lamp units or rod lamp units are combined.

Side Lamp Unit SiU

Figure 14:
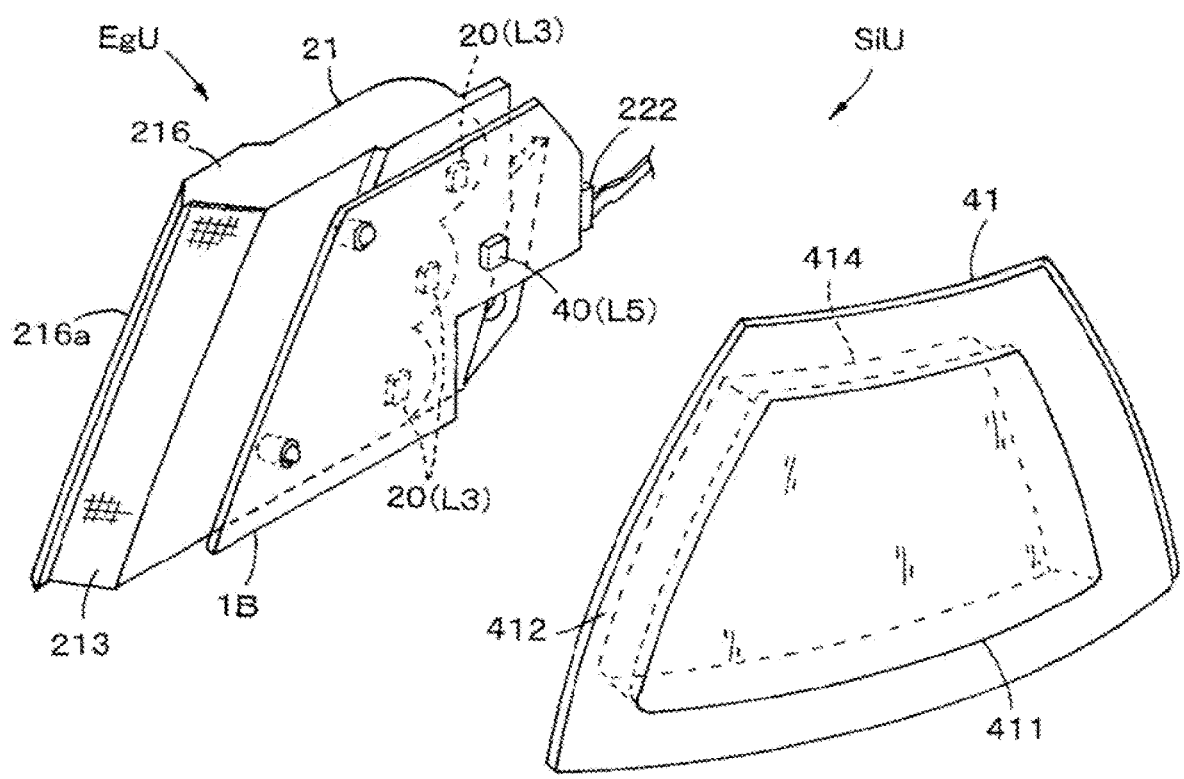
FIG. 14 is an exploded perspective view schematically showing the side lamp unit.

FIG. 14 is an exploded perspective view showing the side lamp unit SiU. A horizontal cross-sectional view of the configuration of the side lamp unit SiU is shown in FIG. 7. The side lamp unit SiU is configured as a side marker lamp unit or a turn signal lamp unit. In this embodiment, the side lamp unit SiU is configured as a turn signal lamp. The turn signal lamp unit includes: the fifth light source L5; and a lens 41.

The fifth light source L5 is mounted on an outer surface in the vehicle width direction of the B-substrate 1B, on which the third light source L3 of the edge lamp unit EgU is mounted. That is, the fifth light source L5 is mounted on a surface opposite to a surface on which the third light source L3 is mounted. The fifth light source L5 includes an LED 40 configured to emit white or amber light. In this embodiment, the fifth light source L5 is configured with a white LED 40. Lighting of the fifth light source L5 is controlled independently of the third light source L3. The fifth light source L5 emits white light outwardly in the vehicle width direction when turned on.

The white LED 40 as the fifth light source L5 is mounted on the B-substrate 1B in a position different from a position in which the white LEDs 20 as the third light source L3 is mounted. That is, the white LED 40 and the white LEDs 20 are not placed back to back. It is preferable that the white LED 40 be far away from the white LEDs 20. It is further preferable that the white LEDs 40 and 20 be as far away from the incident surface 211 and the reflection surface 212 of the edge light guide 21 as possible. Consequently, concentration of heat in a region on the B-substrate 1B in which the white LED 40 and the white LEDs 20 are placed when the white LED 40 and the white LEDs 20 emit light simultaneously is averted, and reliability of the light sources is improved. It is possible to prevent heat when the white LED 40 as the fifth light source L5 emits light from affecting the edge light guide 21.

The lens 41 includes a translucent portion 411 that is made of amber translucent resin and has a curved shape protruding forward. On an edge of the translucent portion 411, frame 412 made of opaque resin, such as black resin, is integrally formed. The translucent portion 411 and the frame 412 are made from, for example, two-color injection molding. The lens 41 extends along an inner surface of the translucent cover 102 outwardly in the vehicle width direction from a front side of the automobile. Although not shown in the drawings, the frame 412 of the lens 41 is supported by the lamp body 101. The opaque frame 412 conceals the B-substrate 1B from view through the translucent cover 102. The frame 412 is provided with visor 414 protruding inwardly along the edge of the translucent portion 411.

The lens 41 is placed such that at least the translucent portion 411 faces the white LED 40 as the fifth light source L5. Light from the white LED 40 is emitted toward a front or left side of the automobile through the translucent portion 411. A desired optical step 413 is formed on an inner surface of the translucent portion 411. White light through the translucent portion 411 is refracted by the optical step 413. The white light is emitted toward the desired region as amber light. When the turn-signal switch SW4 shown in FIG. 3 is operated, the white LED 40 blinks. Consequently, blinking amber light is emitted from the translucent portion 411 toward the front or left side of the automobile, and the side lamp unit SiU functions as a turn signal lamp.

Since the B-substrate 1B extends along a side surface of the edge lamp unit EgU, which is placed adjacently to the B-substrate 1B, light from the white LED 40 as the fifth light source L5 is shielded by the B-substrate 1B and is prevented from leaking into the edge light guide 21. In addition, light reflected by the translucent portion 411 from the white LED 40 and external light through the translucent portion 411 is shielded by the visor 414, which is formed on the frame 412, and is prevented from leaking into the edge light guide 21. Consequently, pretended lighting of the edge lamp unit EgU is averted.

Accordingly, the white LED 40 as the fifth light source L5 is mounted on the B-substrate 1B, on which the third light source L3 is mounted, and the B-substrate 1B is shared by the third light source L3 and the fifth light source L5. Consequently, a separate substrate at least for the fifth light source L5 is not required, and reduction in the number of components of the side lamp unit SiU and downsizing of the side lamp unit SiU can be realized, which leads to reduction in the number of components of the head lamp HL and downsizing of the head lamp HL.

That is, the edge lamp unit EgU is configured as a light-guide-type lamp unit including the light guide 21, and a light source can be considerably freely placed in the light-guide-type lamp unit if a shape of the light guide 21 is designed appropriately. Therefore, even when the side lamp unit SiU placed adjacently to the edge lamp unit EgU is configured as a lens-type lamp unit, a light source can be easily placed in the side lamp unit SiU appropriately. Consequently, the third light source L3 of the edge lamp unit EgU and the fifth light source L5 of the side lamp unit SiU can be mounted on the single B-substrate 1B.

The side lamp unit SiU configured as a Ions-type lamp unit has an optical system different from an optical system of the edge lamp unit EgU configured as a light-guide-type lamp unit. With this configuration, a light source of the edge lamp unit EgU and a light source of the side lamp unit SiU can be mounted on the single substrate.

If the B-substrate 1B includes drive circuit for the third light source L3, the fifth light source L5 can be caused to emit light using this circuit. In this case, a part of the drive circuit for the third light source L3 may function as a drive circuit for the fifth light source L5. Since the connector 222 for connecting the third light source to the lamp ECU 5 is connected to the B-substrate, the fifth light source L5 can be connected to the lamp ECU 5 using the connector 222 and a separate connector is not required.

As for assembly of the head lamp HL, when the edge lamp unit EgU is installed in the lamp housing 100, the fifth light source L5 of the side lamp unit SiU is installed, too. Since installation of the side lamp unit SiU is completed as only the lens 41 is installed to the lamp body 101, the head lamp HL can be assembled simply and quickly.

The B-substrate 1B is supported substantially in parallel along, the outer surface of the edge light guide 21. The optical axis of the edge light guide 21 is in the front-rear direction of the head lamp HL. Therefore, each of the white LEDs 20 and 40 of the third light source L3 and the fifth light source L5 is configured with a chip-type LED flip-chip mounted on the B-substrate 1B, a light-emitting surface of each chip-type LED faces inwardly or outwardly in the vehicle width direction. Since light from the fifth light source L5 is emitted laterally in the vehicle width direction, the optical step 413 for forming a light distribution of the turn signal lamp to emit light through the lens 41 can be easily designed.

Since the B-substrate 1B is integrally supported by the edge light guide 21, heat when the white LEDs 20 and 40 of the third light source L3 and the fifth light source L4 emits light can escape through the B substrate 1B to the lamp body 101, which supports the edge light guide 21. Consequently, efficient and reliable lighting of the white LEDs 20 and 40 can be realized.

The side lamp unit SiU is placed in a bend in the head lamp HL, and the lens 41 is not present anterior to the emission surface 213 of the edge light guide 21. That is, the lens 41 is not present in at least front and lateral regions of the emission surface 213, which inclines outwardly in the vehicle width direction. Therefore, light emitted from the emission surface 213 of the edge light guide 21 toward the front or lateral region is not shielded by the side lamp unit SiU, nor by the lens 41. Light emitted from the lateral emission step 216 of the edge light guide 21 toward the lateral region is not shielded, and a light distribution of the edge lamp unit EgU is not hindered.

The side lamp unit may be configured as a reflector-type lamp unit. The side lamp unit SiU configured as a reflector-type lamp unit is an example of a lamp unit whose optical system is different from that of the edge lamp unit EgU configured as a light-guide-type lamp unit. In this case, a reflector may be placed in the vicinity of the B-substrate 1B to reflect light from the fifth light source L5 in a desired light distribution. The fifth light source L5 may be configured with an LED configured to emit light in a predetermined color. Even if the side lamp unit SiU is configured as a reflector-type lamp unit in this way, the fifth light source L5 can be mounted on the B-substrate 1B, on which the third light source L3 of the edge lamp unit EgU is mounted, too.

The present disclosure is not limited to the embodiments described above, and various modifications can be made. For example, in the low-beam lamp unit and the high-beam lamp unit, the number of the white LEDs as the first light source or the second light source or the configuration of the reflector can be changed as appropriate. The low-beam lamp unit and the high-beam lamp unit may be configured as a lens-, especially, projector-type lamp unit.

In the edge lamp unit, the configuration of the edge lamp guide can be changed as appropriate. In particular, the number of the white LEDs as the third light source and the number of the reflecting surface sections, which are provided in the edge light guide correspondingly to the white LEDs, can be changed as appropriate. The auxiliary reflection steps formed on the boundary surface between the adjacent reflecting surface sections is not limited to knurled-structured one as long as they are configured to reflect light divergently or diffusedly.

In the rod lamp unit, the cross-sectional shape and the front shape of the rod light guide can be changed as appropriate. The reflection surface may be configured differently depending on the shape or size of the rod light guide. For example, a light-reflecting film may be provided on the reflection surface.

Although the edge lamp unit and the rod lamp unit are configured as a clearance lamp and a daytime running lamp, respectively, in the embodiment described above, they may be configured as an auxiliary lamp other than a clearance lamp or a daytime running lamp or a signal lamp. Although the side lamp unit is configured as a turn signal lamp, the side lamp unit may be configured as a side marker lamp, a signal lamp other than turn signal lamp or a side marker lamp, or an auxiliary lamp.

The present application is based on: Japanese Patent Application No. 2019-224321, filed on Dec. 12, 2019; Japanese Patent Application No. 2019-224322, filed on Dec. 12, 2019; and Japanese Patent Application No. 2019-224323, filed on Dec. 12, 2019, the contents of which are incorporated herein by reference.

The invention claimed is:

1. A composite vehicle lamp comprising:
   a lamp unit having:
      a light source; and
      an optical system configured to emit light from the light source in a desired light distribution; and
   a lamp housing configured to house a plurality of the lamp units, wherein
   a first lamp unit of the lamp units is a light-guide-type lamp unit,
   the vehicle lamp further comprising a substrate on which the light source of the first lamp unit and that of a second lamp unit of the lamp units are mounted,
   the light source of the first lamp unit is mounted on one surface of the substrate,
   the light source of the second lamp unit is mounted on a surface of the substrate opposite to the one surface,
   the first lamp unit is placed adjacently to the second lamp unit,
   the substrate is placed between the first lamp unit and the second lamp unit,
   the first lamp unit includes a translucent light-guiding plate,
   the substrate is supported along one plate surface of the translucent light-guiding plate, and the light source of the first lamp unit is mounted on a surface of the substrate facing the translucent light-guiding plate.

2. The vehicle lamp according to claim 1, wherein the optical system of the second lamp unit is different from that of the light-guide-type lamp unit.

3. The vehicle lamp according to claim 1, wherein the substrate extends in an optical axis direction of the vehicle lamp,
the first lamp unit and the second lamp unit are placed such that they are configured to emit light in directions different from the optical axis direction,
the first lamp unit is configured to emit light in a direction almost along the optical axis direction, and
the second lamp unit is configured to emit light such that deviation of the light emitted from the second lamp unit from the optical axis direction of the first lamp unit is larger than deviation of the light emitted from the first lamp unit from the optical axis direction.

4. The vehicle lamp according to claim 1, wherein the first lamp unit is configured to emit light whose color is different from that of light emitted from the second lamp unit.

5. The vehicle lamp according to claim 1, further comprising a lighting controller configured to control lighting of each of the light sources of the lamp units, wherein the substrate is electrically connected to the lighting controller.

6. A composite vehicle lamp comprising:
a lamp unit having:
a light source; and
an optical system configured to emit light from the light source in a desired light distribution;
a lamp housing configured to house a plurality of the lamp units; and
a lighting controller configured to control lighting of the plurality of the lamp units, wherein
the plurality of the lamp units includes:
one light-guide-type lamp unit having a light guide; and
another light-guide-type lamp unit having another light guide whose form is different from that of the one light-guide-type lamp unit,
the one light-guide-type lamp unit and the another light-guide-type lamp unit are turned on as lamps having the same function,
the lighting controller is configured to turn on the one light-guide type lamp unit and the another light-guide-type unit simultaneously, and
the lighting controller is configured to control the one light-guide-type lamp unit and the another light-guide-type lamp unit such that brightness when the one light-guide-type lamp unit is turned on is different from brightness when the another light-guide-type lamp unit is turned on.

7. A composite vehicle lamp comprising:
a lamp unit having:
a light source; and
an optical system configured to emit light from the light source in a desired light distribution;
a lamp housing configured to house a plurality of the lamp units; and
a lighting controller configured to control lighting of the plurality of the lamp units, wherein
the plurality of the lamp units includes:
a rod lamp unit whose optical system is configured with a rod light guide;
an edge lamp unit whose optical system is configured with an edge light guide;
a third lamp unit configured as a reflector-type lamp unit whose optical system is configured with a reflector; and/or
a lens-type lamp unit whose optical system is configured with a lens,
the rod lamp unit and the edge lamp unit are turned on as lamps having the same function,
the rod lamp unit and the edge lamp unit are placed adjacently to the third lamp unit,
the lighting controller is configured to turn on the rod lamp unit and the edge lamp unit simultaneously, and
the rod lamp unit and the edge lamp unit are parallel to a circumferential direction of the third lamp unit and placed around the third lamp unit.

8. The vehicle lamp according to claim 7, wherein the lighting controller is configured to control the rod lamp unit and the edge lamp unit such that brightness when the rod lamp unit is turned on is equal to brightness when the edge lamp unit is turned on.

* * * * *